Feb. 24, 1959  R. W. TRIPP  2,875,390
AUTOMATIC MACHINE CONTROL SYSTEM
Filed Jan. 3, 1956  19 Sheets-Sheet 1

ROBERT W. TRIPP,
INVENTOR.

BY W. E. Beatty

ATTORNEY.

Feb. 24, 1959 R. W. TRIPP 2,875,390
AUTOMATIC MACHINE CONTROL SYSTEM
Filed Jan. 3, 1956 19 Sheets-Sheet 2

ROBERT W. TRIPP
INVENTOR.

BY *W. E. Beatty*

ATTORNEY.

Feb. 24, 1959     R. W. TRIPP     2,875,390
AUTOMATIC MACHINE CONTROL SYSTEM
Filed Jan. 3, 1956     19 Sheets-Sheet 4

*Fig. 4.*

ROBERT W. TRIPP,
*INVENTOR.*

BY *W E Beatty*

*ATTORNEY.*

Feb. 24, 1959  R. W. TRIPP  2,875,390
AUTOMATIC MACHINE CONTROL SYSTEM
Filed Jan. 3, 1956  19 Sheets-Sheet 9

ROBERT W. TRIPP,
INVENTOR.

BY *W E Beatty*

ATTORNEY.

Feb. 24, 1959    R. W. TRIPP    2,875,390
AUTOMATIC MACHINE CONTROL SYSTEM
Filed Jan. 3, 1956    19 Sheets-Sheet 11

ROBERT W. TRIPP,
INVENTOR.

BY W. E. Beatty
ATTORNEY.

Feb. 24, 1959  R. W. TRIPP  2,875,390
AUTOMATIC MACHINE CONTROL SYSTEM
Filed Jan. 3, 1956  19 Sheets-Sheet 13

ROBERT W. TRIPP,
INVENTOR.

BY *W E Beatty*

ATTORNEY.

Feb. 24, 1959

R. W. TRIPP 2,875,390

AUTOMATIC MACHINE CONTROL SYSTEM

Filed Jan. 3, 1956

ROBERT W. TRIPP
INVENTOR.

BY W E Beatty

ATTORNEY.

Feb. 24, 1959 R. W. TRIPP 2,875,390
AUTOMATIC MACHINE CONTROL SYSTEM
Filed Jan. 3, 1956 19 Sheets-Sheet 16

ROBERT W. TRIPP,
INVENTOR.

BY W. E. Beatty

ATTORNEY.

Feb. 24, 1959 — R. W. TRIPP — 2,875,390
AUTOMATIC MACHINE CONTROL SYSTEM
Filed Jan. 3, 1956 — 19 Sheets-Sheet 17
*Fig. 17.*
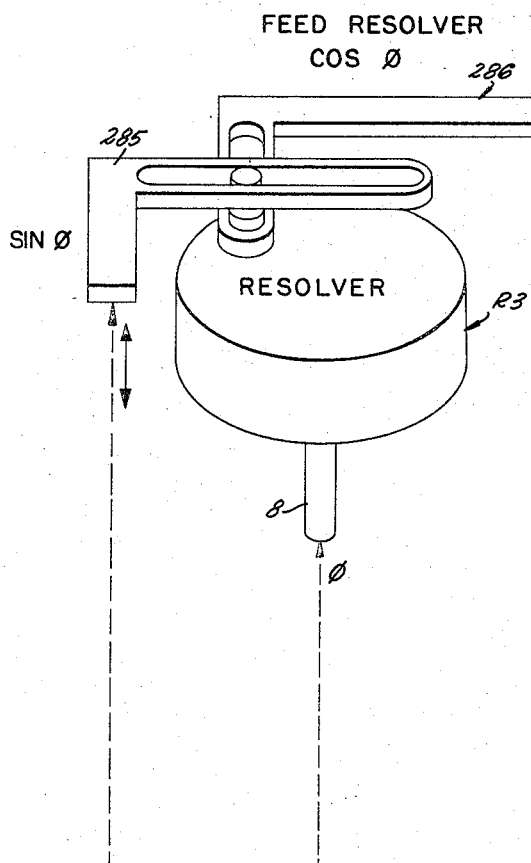
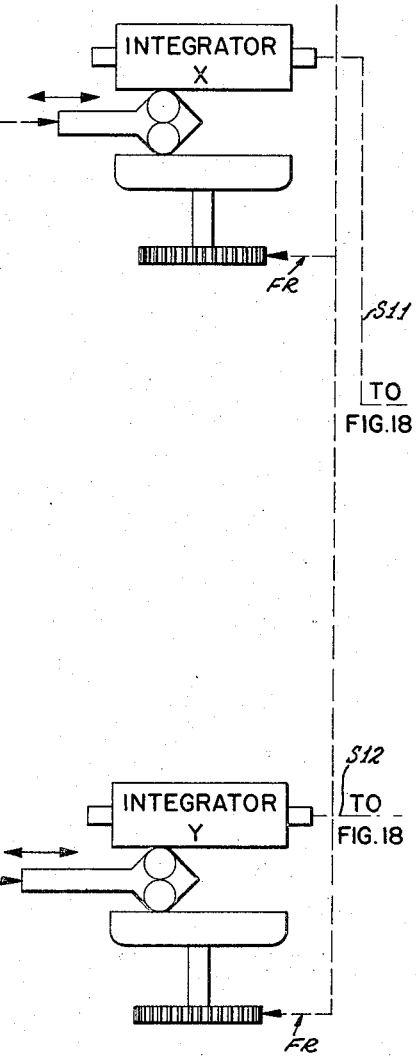
ROBERT W. TRIPP,
INVENTOR.
BY W. E. Beatty
ATTORNEY.

Feb. 24, 1959  R. W. TRIPP  2,875,390
AUTOMATIC MACHINE CONTROL SYSTEM
Filed Jan. 3, 1956  19 Sheets-Sheet 18
Fig. 18.
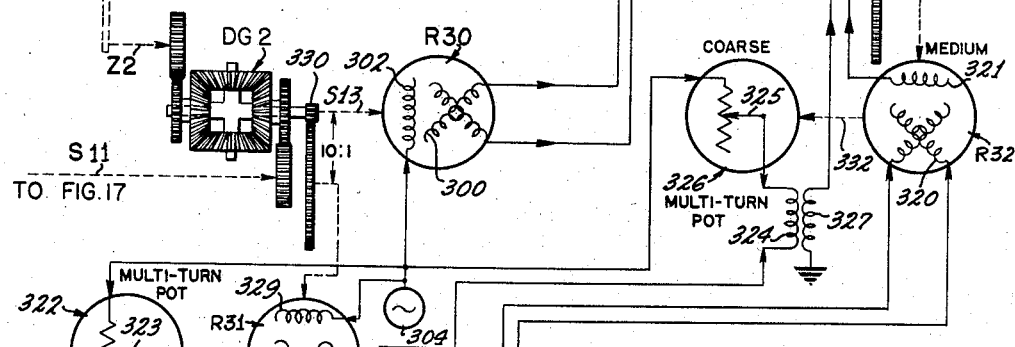
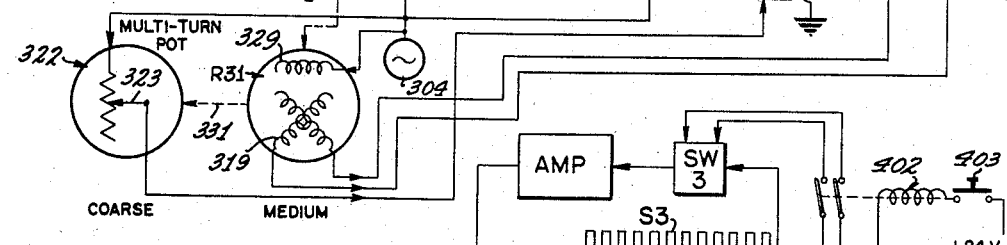
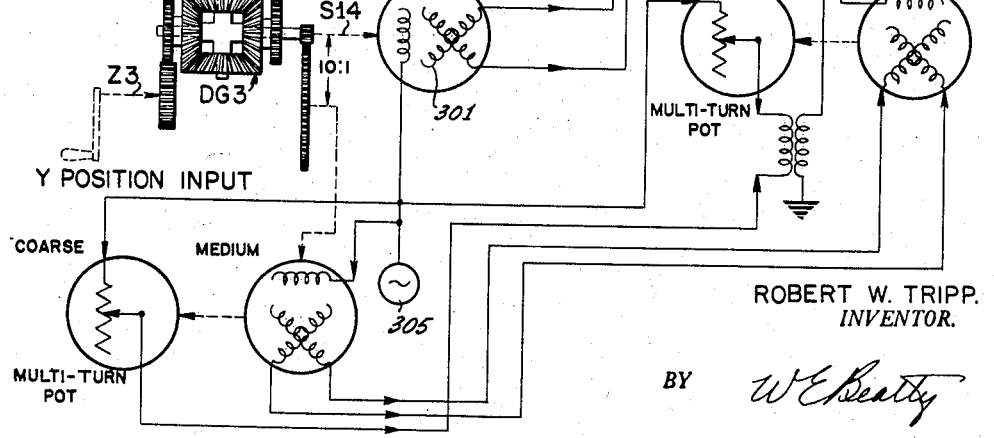
ROBERT W. TRIPP.
INVENTOR.
BY *W. E. Beatty*
ATTORNEY.

Feb. 24, 1959  R. W. TRIPP  2,875,390
AUTOMATIC MACHINE CONTROL SYSTEM
Filed Jan. 3, 1956  19 Sheets-Sheet 19

ROBERT W. TRIPP,
INVENTOR.

BY W E Beatty

ATTORNEY.

United States Patent Office 2,875,390
Patented Feb. 24, 1959

2,875,390

AUTOMATIC MACHINE CONTROL SYSTEM

Robert W. Tripp, Bronxville, N. Y., assignor, by mesne assignments, to Inductosyn Corporation, Carson City, Nev., a corporation of Nevada Application January 3, 1956, Serial No. 557,035

31 Claims. (Cl. 318—39)

The invention relates to the use of a program for controlling a driven element such as a machine tool, the program including input data in terms of the path of the driven element or machine tool.

According to the invention, means are provided for translating the input data into electrical signals for corresponding rotary movement of a shaft, with means for resolving the shaft movement into other electrical signals for linear displacements mutually at right angles to each other, and with means for translating said displacements into drives for said driven element, the speeds of said drives having relative values corresponding to the path.

Objects of the invention are to reduce the amount of input data required, machine along smooth continuous paths having rate of change of curvature and/or curvature and/or slope, and obtain a high degree of positional control accuracy such as to .0001 inch.

Also, various cutters may be employed without altering the input program, as described and claimed in co-pending application Ser. No. 561,769, filed January 27, 1956 by Robert W. Tripp for "Tool Radius Correction Computer," and assigned to the assignee of the present application.

The above objects are accomplished by employing a precision measuring transformer known as an "Inductosyn" to attain high precision, and by employing analog computers to provide continuous data of feed rate, and one or more of the following items, namely, slope, curvature, and rate of change of curvature, to drive servos which position the machine tool relatively to the work piece to be cut.

A further object of the invention is to provide input data for the rate of change of curvature on a binary basis, the remainder on a decimal basis, computers being provided for converting this binary and decimal digital data to analog values.

In prior control systems, it has been customary to provide a tabulation of successive points on the required surface to be cut, the data consisting of straight line segments which are approximations of the desired surface. A more satisfactory machine part and a very large reduction in the amount of the required input data, as well as increased flexibility and accuracy are obtained according to the present invention wherein the inputs include slopes, curvatures, and rates of change of curvature of the surface to be cut, whereby the method and system of the present invention are capable of machining continuous curves instead of straight line segmental approximations of the curve or surface to be cut.

A further object of the invention is to provide an adjustable zero reference for the origin or reference position with respect to the X and Y orthogonal axes along which machine drives are relatively driven to obtain a cutting path referenced to such axes. Thus the position of each axis for the machine drive may be referred to any selected origin of coordinates, either within the machine or outside of it.

While the invention will be described with reference to two orthogonal axes, referred to as X and Y, the method and means herein described may be extended to apply also to a third axis Z at right angles to the plane of X and Y, as described and claimed in application S. N. 608,204, filed September 5, 1956 for Three-Dimensional Control Method and System.

While some features of the invention may be applied to items such as jigborers where the position of a tool with respect to a work piece is of importance, the path taken to reach that position being unimportant, the invention is particularly concerned with the tool path, whether the tool has coordinate mounts as in Fig. 18, or whether the tool is stationary, the work piece having coordinate mounts, or whether the tool and the work-piece are each movable along a coordinate axis. The invention provides driven elements along coordinate axes to position the work piece and tool or drive them relatively to each other along a path. Generally speaking, any path may be sub-divided into elements of different orders, namely slope, curvature and rate of change of curvature. It is a particular object of the invention to provide input information or data of these elements on a digital basis, so that by a proper choice of digits, for example, by a proper choice of the location of holes in a card, one can obtain a path having these elements, separately or in combination. For this purpose, the invention provides the following components, namely, slope control, curvature control, rate of change of curvature control, feed rate, feed rate resolver and inductosyn. Further objects of the invention will be apparent from the following brief description of these components under their respective headings.

SLOPE CONTROL

The slope of the path depends on the ratio of the feed rates of the driven elements along the X and Y coordinate axes. An object of the invention is to establish this ratio with a single datum of input information. This is accomplished by resolving the angular position of a shaft (feed resolver) into co-function controls in space quadrature (ball slides of X and Y integrators) to establish the feed rates and hence their ratio, on the X and Y axes. The resolver shaft position is established from input information of slope angles expressed in terms of angles on a decimal basis, a digital-to-analog converter being provided to convert this input to the angular shaft position as described and claimed in co-pending application Ser. No. 540,748, filed October 17, 1955, by R. W. Tripp, for "Automatic Shaft Control" and assigned to the assignee of the present application, wherein Figs. 7 to 12 inclusive correspond to Figs. 1 to 6 of said co-pending application, which also claims a computer for computing an angle equal to the sum of the angles represented by the digits in decimally related digital groups of the input.

CURVATURE CONTROL

Curvature of the path likewise depends on the ratio and on the change therein of the feed rates of the driven elements on the X and Y axes. An object of the invention is to change this ratio, as required for a circular path, i. e., part or all of a circle, with a single datum of curvature input formation. This is accomplished by providing curvature input information on a decimal basis in terms of curvature (reciprocal of radius) and by converting this digital data to an analog value expressed as a shaft speed for addition to the shaft position as determined by the slope control.

RATE OF CHANGE OF CURVATURE CONTROL

Rate of change of curvature of the path depends on a change of the rate of the curvature feed rate control, the latter stemming from shaft rotation. An object of the invention is to provide rate of change of curvature input data and convert it into analog form for controlling or modifying the curvature values, which in turn modify or control the slope value, so that the combined effect of all of these items may be resolved into co-function space quadrature feed rates for the X and Y drives, whereby the driven elements on the X and Y axes will relatively move along a path defined by the various items of input data. The rate of change of curvature control involves (a) input data, (b) its conversion to shaft speed, and (c) its sequence of operation in relation to program advance, these items being generally described here as they also constitute features of the invention.

(a) *Input data.*—The invention provides a binary gear ratio which can be changed stepwise almost instantaneously, while recognizing that a lower accuracy can be tolerated for the path element of highest order because the integration has been chosen to cover 1 inch or less. Since the curve generated is discontinuous only in its highest order input, a binary gear ratio controlled by the highest order input data is provided in order to permit essentially instantaneous changes in this highest order data.

A 10 bit binary gear device is undesirable as the presence of holes in all or a large number of the 10 positions in one row (or column) would weaken the card. To prevent punching more than one hole per row (or column) the invention provides, for the binary circuits, input data based on a system of numeration having a radix of a higher order than 2. In the example shown, the radix is octal, i. e., $2^3$, data in this digital form being converted to binary form, whereby, any combination of the ten binary circuits can be obtained by selecting one out of 8 holes in three groups and 1 hole in a binary group, a total of 4 holes. A radix other than $2^3$ may be used in the present case as well as in the case of a different number of binary circuits.

(b) *Conversion to shaft speed.*—A feature of the invention is the provision of the feed rate drive as the input drive for the binary gear device, whereby the speed of the output shaft of the binary gear device can be given any one of a large number of values determined by that binary bit multiple of the feed rate speed determined by the clutches energized. The principle of operation of the binary gear device is explained on pages 31 to 33 of the following publication, "Designing Computing Mechanisms" by Macon Fry, Reprinted from Machine Design, August 1945 through February 1946, although the construction and use of the binary gear device as disclosed and claimed herein are outside the realm of that publication. The equation of the spur gear differential disclosed herein is Equation 7 page 8, volume 27, Radiation Lab. Series, pub. 1948 by McGraw-Hill Book Co., using a value of ½ for Q in that equation. In other words, the speed of the output shaft of a cell equals ½ the sum of the speeds of the spider and the input shaft. Bevel gears can be used, but this requires off-set shafts, as the output must be taken from the spider to conform to the above equation.

(c) *Sequence.*—Concerning the sequence of operation of the binary gear device in relation to the program advance, the objects of the invention are, hold the clutches of the differential in the energized state from one command to another, change from one state to another at exactly the time desired, hold the binary translation for a short time until the equipment is ready to accept it, hold the clutches energized independently of the translating circuits, utilize the translating circuits to operate on the next data while current data is being used, and to provide a circuit which makes it possible to "read" the punched card or tape at a relatively slow rate and during times when the previous information is being held in the storage and on the clutch coils, while making it possible to change the state of the clutch coils, and obtain the shaft speed called for by the input, very rapidly and at an accurately chosen time or under accurately chosen conditions.

FEED RATE

A further object of the invention is to prevent the feed rate motor from operating the X and Y drives in accordance with the rate of change of curvature data, at times when either the slope control or the curvature control are in the transitory stage of advancing to new positions called for by their respective input data, whereby the X and Y drives are prevented from acting under the influence of only a part of the various input data, these drives acting only when all items of input data are conditioned to exert their joint influence as called for by all items of the input.

A further object of the invention is to prevent the X and Y drives from operating during the above-mentioned transitory stages when there is an advance from one set of input data to another, when this advance is brought about either manually, or automatically, by the card reader. This is accomplished by converting the slope input data and curvature input data into error signals, as usual in servo control, to position the corresponding slope and curvature controls, and by disabling the feed rate drive until both of these error signals are reduced to null, with the slope and curvature controls in the conditions called for by their respective input data.

FEED RATE RESOLVER

The object of the invention here is to resolve the combined analog values of the various path elements into space quadrature drives for the machine X and Y elements. This is accomplished by using these analog values to control the shaft of a resolver having co-function outputs in the relation of sin $\phi$ and cos $\phi$, the latter being integrated with the feed rate for controlling the speed ratio of the X and Y machine drives.

INDUCTOSYN

A further object of the invention is to position or rotate the shaft of the feed resolver and to position or move the linear machine drives with great accuracy. This is accomplished by employing a rotary or linear embodiment of the inductosyn as the coarse and/or fine data element in servo systems controlled by these data elements. Rotary coarse and fine data elements are illustrated for controlling the shaft of the feed resolver, while fine data linear elements are shown for controlling the machine drives, coarse data elements not shown being understood for the machine drives. The coarse data element may be a conventional two-pole resolver or it may be an inductosyn or position measuring transformer of the type described and claimed in patent application Ser. No. 536,464, filed September 26, 1955, by R. W. Tripp, the fine data element being preferably a position measuring transformer of the type described in patent application Ser. No. 509,168, filed May 18, 1955, by R. W. Tripp and J. L. Winget, Patent 2,799,835, issued July 16, 1957, both cases being assigned to the assignee of the present application.

Such inductosyn or transformers may comprise two inductively related metallic conductor patterns on glass members movable with respect to each other, one fastened to each of the machine elements whose relative positions or motions are to be controlled. One member bears a continuous winding in the form of a multiplicity of conductors disposed in a plane parallel to the direction of relative motion of the members, the conductors extending transversely of that direction. The conductors are connected into a single series circuit so that adjacent portions carry current in opposite directions transversely of the length of the array. The second member bears two windings similar to the winding of the first member but usually shorter and disposed with respect to each other in space quadrature of the cycle defined on the continuous winding of the first member by the separation, center to center, of three adjacent conductors of that winding, the separation being taken in the direction of relative motion of the two members. The members are supported for relative motion with their windings at a small and constant separation, and the design of the windings is preferably such that the voltage induced in any of them by a current in a winding of the other member is a substantially sinusoidal function of the relative position of the members, cyclical in a change of relative position of the members equal to this pole cycle.

The Inductosyn is similar in action to a resolver, but having a larger number of poles. The pole pair spacing of the linear Inductosyn may be one-tenth inch which corresponds to 360 electrical degrees. Experience indicates that it is possible to control positioning to an electrical angle of one milli-radian (on a 54-pole rotary Inductosyn, one milli-radian is equivalent to four seconds of arc); the accuracy of the linear Inductosyn is therefore 1/6280 of one-tenth inch, or approximately 16 microinches. The accuracy of the rotary Inductosyn is 5 to 10 seconds of arc, the equivalent of .00005 in. at a mean radius of 1 inch.

For further details of the invention reference may be made to the drawings wherein Fig. 1 is a key sheet showing how Figs. 2 to 18 inclusive, can be arranged side by side to provide a complete system according to the invention.

Fig. 2 is a schematic circuit drawing of three stepping switches or steppers for converting the feed rate input data into a voltage for controlling the feed rate motor of Fig. 13.

Figs. 3, 4, and 5 are schematic circuit drawings of other stepping switches and circuits for converting the input data, in octal form (successive powers of 8) into binary data for supply to the binary gear ratio of Fig. 14.

Fig. 15 is a schematic circuit drawing of the circuits and drive for the curvature integrator, controlled jointly by the curvature data from Fig. 6 and by the rate of change of curvature determined by the variable speed drive supplied by the binary gear ratio of Fig. 14.

Fig. 16 is a schematic circuit drawing of coarse and medium resolvers controlled jointly by the curvature integrator of Fig. 15 and by the angular input data from Figs. 11 and 12, and positioning an output shaft according to the added effects of such data.

Fig. 17 is a schematic drawing partly in perspective of a resolver for resolving the shaft position determined by the apparatus of Fig. 16, into linear displacements, for integration with the feed rate supplied by Fig. 13.

Fig. 18 is a schematic drawing of resolver servo control for positioning machine elements on orthogonal X and Y axes, in response to the speeds resulting from the integration effected in Fig. 17, and/or from the zero offset adjustment shown in Fig. 18.

Fig. 19 is a plan view of a machine tool having drives along the X and Y axes shown for advancing a work piece and a cutter or tool relatively to each other.

Figure 1:
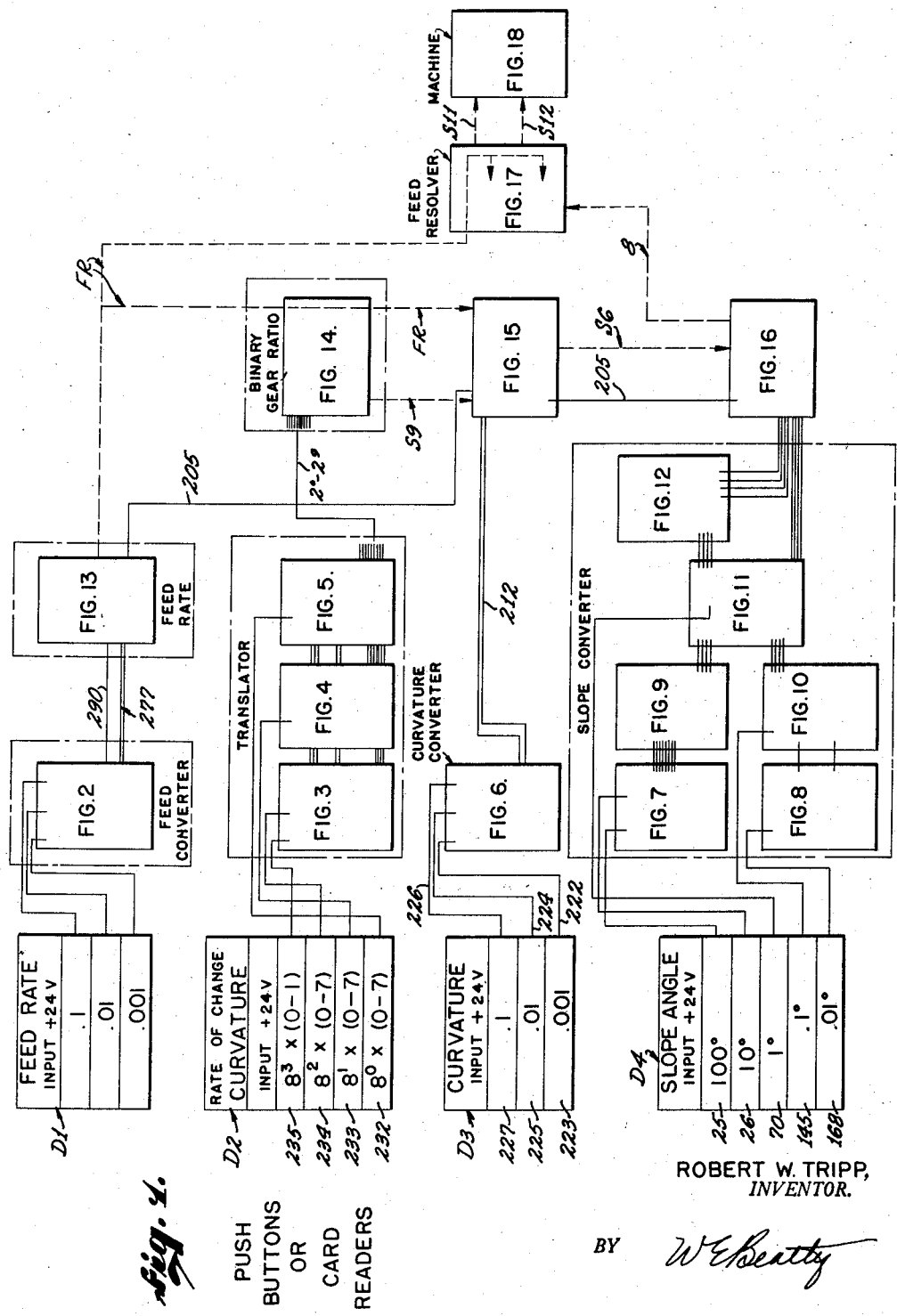

Referring in detail to Fig. 19, the tool 172 is positioned or moved relatively to a work piece 185. The machine may be a jigborer or preferably a planer type milling machine having a tool 172 which rotates on an axis perpendicular to the plane of the X axis A1 and the Y axis A2, these axes being reference axes having the origin 187. The table 186 has a work piece 185 fixed thereon and the tool 172 is moved along a path to cut a continuous contour as called for by the input data designated by the inputs D1, D2, D3 and D4 in Fig. 1. The tool 172 may remain on a fixed axis and the X and Y drives may be used to move the work piece 185 with relation to the tool 172. For three dimensional control a spherical tool may be used. Motor M1 is carried by the frame and drives a lead screw 184 which operates a nut 179 to drive the slide or carriage 178 along ways 177 in a direction parallel to the X axis A1. Fixed with respect to the frame is the elongated scale S1 of an inductosyn having a cooperating inductosyn slider S2 mounted on the carriage or slide 178. Motor M2 is mounted on the carriage or slide 178 and drives a lead screw 175 which operates a nut 176 to drive the tool carriage 173 on ways 174 in a direction parallel to the Y axis A2. The scale S3 of an inductosyn is mounted on slide 178 and its cooperating slider S4 is mounted on the carriage 173.

The X and Y drives for the machine, separated from the machine itself and shown in association with the controls for the motors M1 and M2 are shown in Fig. 18.

The following description will deal with the slope converter, the curvature converter, the rate of change of curvature translator and the feed rate converter in that order, followed by a description of the use of the analog signals produced by these items for controlling the machine drives of Figs. 18 and 19.

SLOPE CONVERTER

The slope data input D4, Fig. 1 is here shown as angular data on a decimal basis including five groups of digits as follows:

Coarse, 0° to 300° in steps of 100°, indicated at 25.
Coarse, 0° to 90° in steps of 10°, indicated at 26.
Coarse and fine, 0° to 9° in steps of 1°, indicated at 70, this being both coarse and fine, which overlap.
Fine input, .1° to .9° in steps of .1°, indicated at 145.
Fine, .01° to .09° in steps of .01°, indicated at 168.

The above reference to degrees refers to the rotation of a shaft schematically shown at 8, in Figs. 16 and 17. The input 1 may be a card reader and a feeler brush applies 24 volts in a column corresponding to the digit selected by a hole on the card, not shown, to apply this potential to operate the appropriate stepping switch as follows. Stepping switch 101, stepper #1 Fig. 7, has 100° steps as indicated and is operated by stepping magnet 7. Stepping magnet 7 has a stepping coil 2 which steps the wipers 3 and 4 until wiper 3 finds the contact in the bank 5 to which a potential of 24 volts has been applied by the card reader, whereupon the relay 6 opens the circuit of the stepping coil 2, as usual with a conventional rotary switch.

The stepping switches 101 to 107 are caused to take a position corresponding to that of the hole in the card. The auxiliary relays like 6 in Fig. 7 and the stepping coils like 2 are wired so that the stepping switch steps continuously by alternately making and breaking its energizing circuit until it reaches the contact that is energized by the punched card, at which time, the relay like 6 breaks the circuit to the stepping coil like 2 and the stepping switch stops. At the end of this operation, the 24 volt supply can be disconnected from the stepping switch circuit and the switches 101 to 107 will stay in that position when the card is removed.

Figure 7:
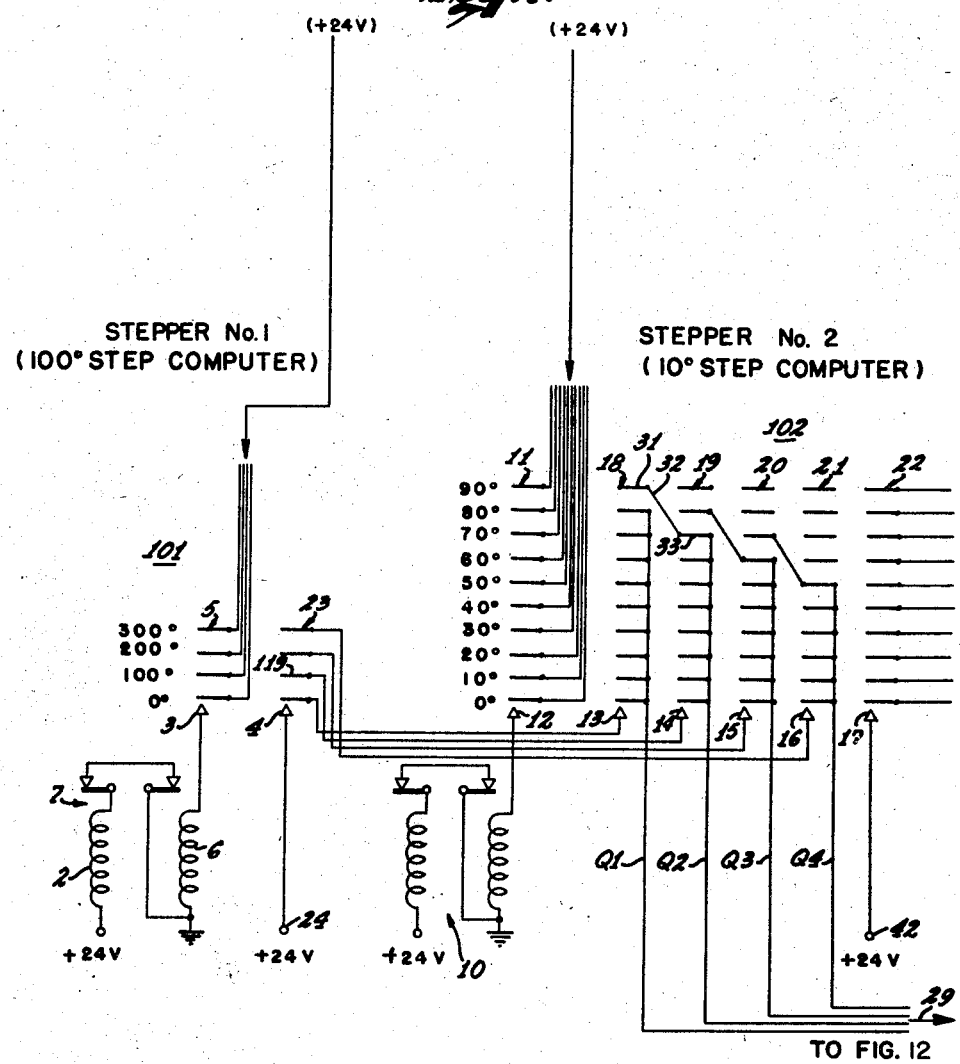
Figs. 7, 8, 9, 10, 11 and 12 are schematic drawings of circuits and steppers for converting angular input data in terms of slope, into electrical values for controlling the coarse and fine resolvers of Fig. 16.

Stepping switch 102, stepper #2 Fig. 7, is operated by stepping magnet 10 to select a switch contact in the bank 11 corresponding to the particular 10° step selected by the digit of the input. Switch 102 includes wipers 12, 13, 14, 15, 16 and 17, all of which make contact with the contacts in their respective banks 11, 18, 19, 20, 21 and 22.

The use of the various stepping switches like 101 makes it possible to provide an input control in the form of a perforated card to provide a wide range of analog voltages, without subjecting the card to such analog voltages, the card being subjected only to the operating potential here illustrated as 24 volts.

Switch 101 includes a contact bank 23 and its wiper 4 connects the 24 volt source indicated at 24 to one of the four contacts in the bank 23, to connect the 24 volt source to one of the four corresponding wipers 13, 14, 15 or 16 in the stepping switch 102. The 24 volt source indicated at 24 is thus extended out through one of the four corresponding quadrant lines Q1, Q2, Q3 and Q4, depending upon the levels to which the switches 101 and 102 are operated. Thus any angle set up in the input 1, in block 25 which includes 100 degree steps, or block 26 which represents 10 degree steps, results in putting a potential on one of the four lines Q1 to Q4, depending upon the quadrant in which the angle exists. It will be noted that all of the contacts in the bank 18 from zero to 80° are connected by a strap 30, to extend the connection from wiper 13 to line Q1 for angles from 0 to 80°, these angles being in the first quadrant represented by line Q1. The top contact 31 in the bank 18 is connected by a strap 32 to the contact 33 at the 70° level in the bank 19 with the result that when contacts 12 to 17 reach the 80° level, the 24 volt battery indicated at 24 is connected out through the lead Q2, representing the second quadrant. The reason for this is that the sine of 90° is the same as the cosine of zero, and when going from 80° to 90°, stepping switch 103, stepper #3, Fig. 12, is operated to convert the quadrants and perform two functions, namely: (1) Decide on the sign of sine and cosine which changes from quadrant to quadrant, and (2) decide on whether the value computed by the 10° computer switch 104, stepper #4 Fig. 9, and the 1° step computer switch 105, stepper #5 Fig. 11, will be supplied to the quadrature coils 34 and 35, Fig. 16 in one order or in the reverse order.

The coils 34 and 35 are part of a coarse resolver 37, Fig. 16, having a rotatable coil indicated at 36. This resolver 37 is a conventional two pole resolver and the rotor 36 is driven to an angle determined by the sine of the sums of the angles established by the switches 104 and 105.

Hereafter will be given an explanation of the computation of the sine and cosine of the sums of angles, switches 104 and 105 serving to compute the sum of the 10° digit selected by switch 104 and the 1° digit selected by switch 105, while switch 107, Fig. 8, and switch 106 Fig. 10 compute the signal values for the sine and cosine of the sums of the .01° digit selected by switch 107 and the .1° digit selected by switch 106, the sum of that value and the 1° value selected by switch 105, also being computed for supply to the quadrature windings 130 and 131 of the fine data element 68, Fig. 16.

In a similar way, the wiper 14 of switch 102, Fig. 7 which is connected to the 100° level of switch 101 connects the 24 volt battery indicated at 24 from line Q2 to line Q3 when moving from the 70° level to the 80° level, 180° being taken as in the third quadrant. Also, the wiper 15 which is connected to the 200° level of switch 101, extends the connection of battery 24 from line Q3 to line Q4 when moving from the 60° level to the 70° level, as 270° is taken as being in the fourth quadrant.

The lines Q1, Q2, Q3 and Q4 are extended, as indicated by cable 29 to the corresponding terminals Q11, Q12, Q13 and Q14 of stepper switch 103, Fig. 12 which is a quadrant converter. Switch 103 has other similar contacts on corresponding levels, including contacts C1, C2, C3, C4 which are connected to the corresponding movable wipers C11 to C14 respectively, on the 10° step computer switch 104, Fig. 9. Switch 104 has a stepping magnet 40, all stepping magnets here shown being as described in connection with the stepping magnet 7 for switch 101. The relay 41 of stepping magnet 40 stops the advance of this switch, 104 Fig. 9 when the appropriate one of the wipers C11 to C14, as determined by which one of the contacts C1 to C4, Fig. 12 is connected in circuit, finds the potential of battery 42, Fig. 7 as controlled by wiper 17, at one of the banks of contacts controlled by the wipers C11 to C14, Fig. 9.

Figure 9:
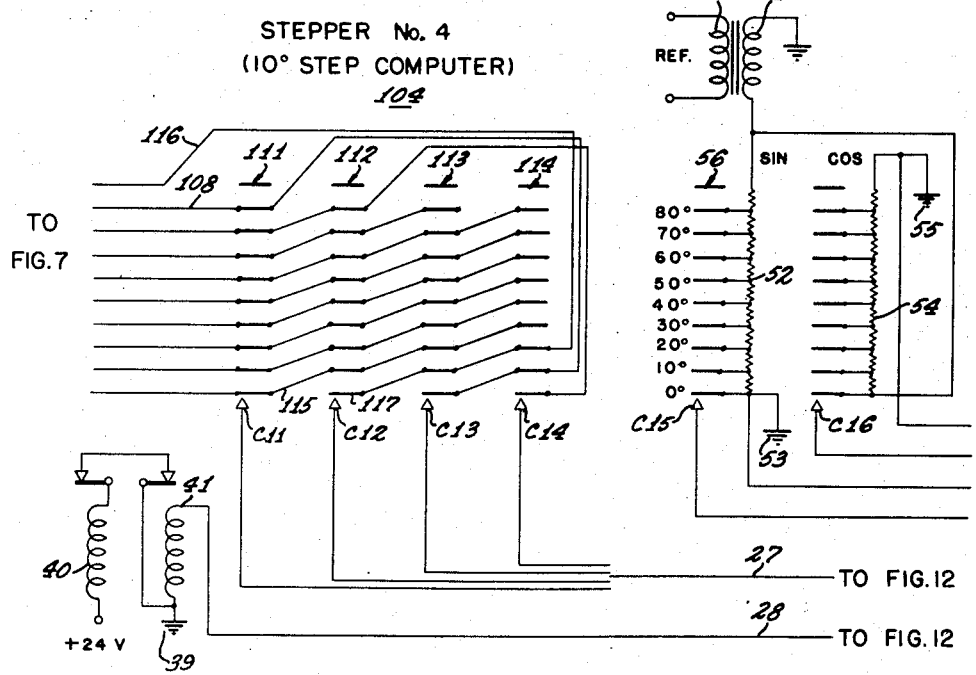

Cable 27 in Fig. 9 and Fig. 12 represents the four conductors connecting wiper C11 to C14 to their respective contacts C1 to C4. Line 28 in Fig. 9 connects the relay 41 to wiper 91 in Fig. 12. Cable 29 in Fig. 7 represents the four conductors connecting the line Q1 to Q4 to their contacts Q11 to Q14.

Switch 104 also has wipers C15 and C16. A reference source of potential 50, Fig. 9, is connected through grounded secondary winding 51 to a potentiometer 52 connected to ground at 53, winding 51 being reversely connected to potentiometer 54 and ground 55. The wiper C15 has a bank of stationary contacts indicated at 56 connected to potentiometer 52, in equal steps proportional to the ten degree steps shown. Potentiometer 54 has corresponding steps. The position of wipers C11 to C16 of switch 104 determines the value of sine picked off by wiper C15 and supplied to transformer primary winding 57, Fig. 11 that likewise determines the value of cosine picked off at that level and supplied by wiper C16 to transformer primary 58. Primary 58 is connected reversely with respect to winding 57 to obtain a negative product term as required for cosine $(a+b)$.

Figure 11:
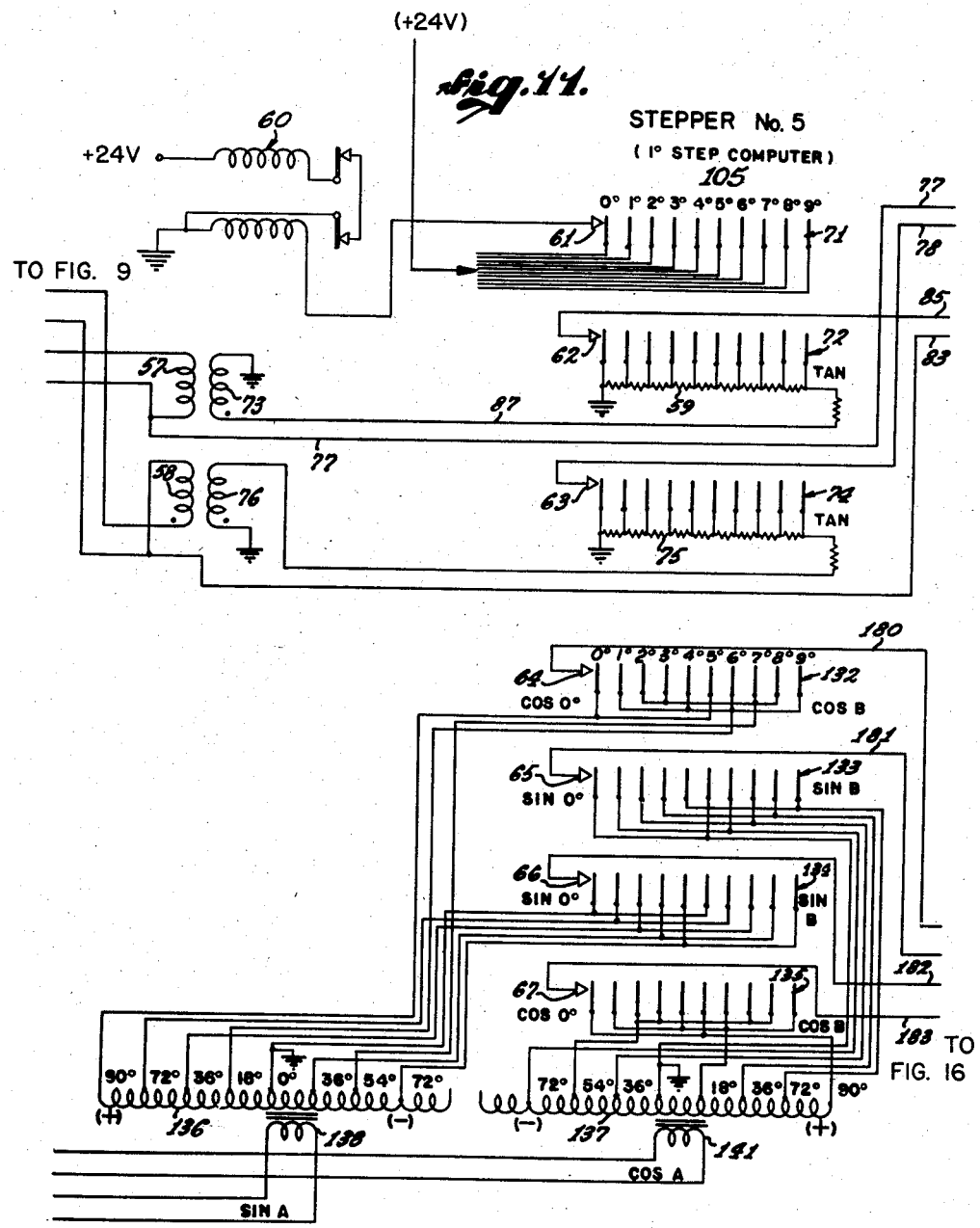
Figure 12:
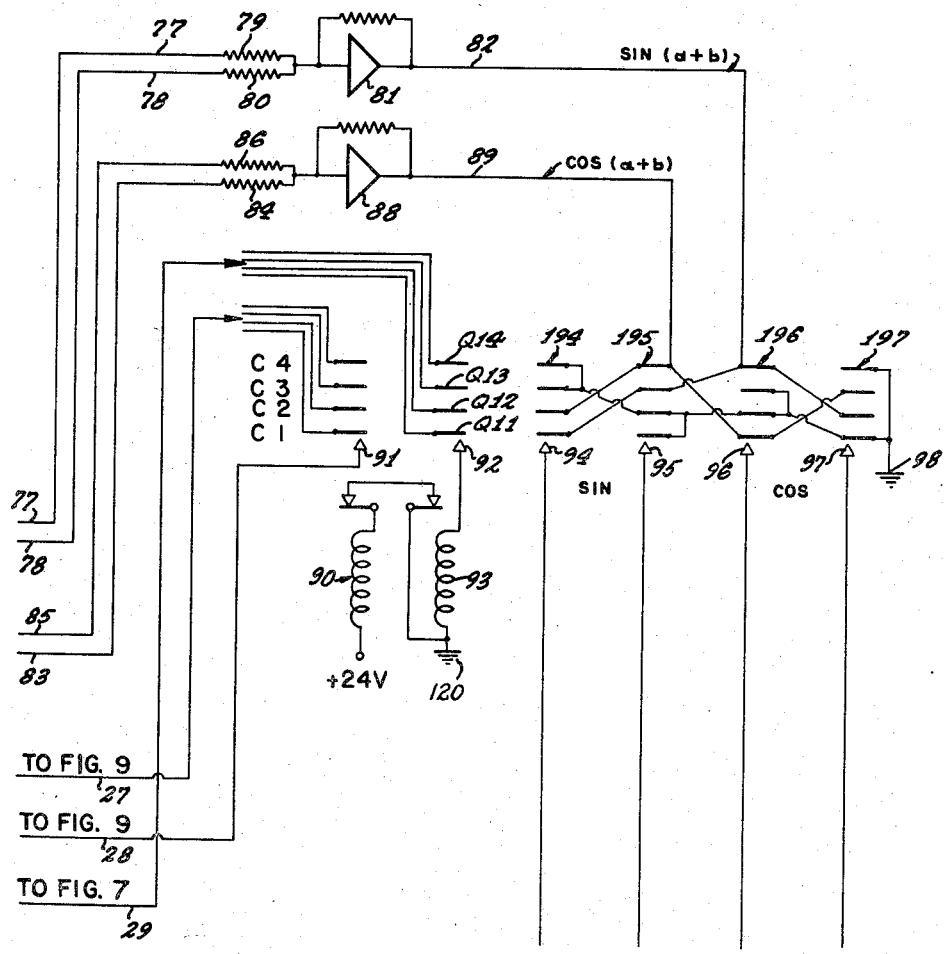

Switch 105, Fig. 11, is a 1° step computer having a stepping magnet 60 which moves its wipers 61, 62, 63 leading to the coarse resolver or coarse data element 37 as well as its wipers 64, 65, 66, and 67, Fig. 11, leading to the fine data element or position measuring transformer 68, determined by the particular digit represented by a hole in the input block 70. A hole at such digit, in units of degrees, puts a 24 volt potential on the corresponding one of the contacts in the bank 71 to determine the level to which switch 105 will operate. Wiper 62 controls a contact bank 72 leading to a step potentiometer 59, proportional to the tangent of the angle and in circuit with the secondary winding 73 which is energized by primary winding 57. Also switch 105 has a bank of contacts 74 controlled by wiper 63 and connecting a potentiometer 75 in equal steps proportional to the tangent, this potentiometer being in circuit with secondary winding 76 energized by primary winding 58. Line 77 is connected to the input side of primary 57 to pick off a value proportional to sine $(a)$, assuming $(a)$ represents the angle that is determined by switch 104, Fig. 9, while the line 83 picks off a signal value proportional to the cosine $(a)$, which value of cos $(a)$ is also fed by secondary 76, and multiplied by tan $(b)$ and picked off in steps by wiper 63, assuming angle $(b)$ represents the angle selected by that switch. The line 77 Figs. 11 and 12, includes a mixing resistance 79 and line 78 includes a mixing resistance 80, these mixing resistances supplying through amplifier 81 to line 82 Fig. 12, a signal value proportional to sin $(a+b)$. Similarly, the line 83 Figs. 11 and 12 supplies to the mixing resistance 84 a signal value proportional to cos $(a)$, while the line 85 supplies to the mixing resistance 86 a signal value proportional to the product of sine $(a)$, from the output line 87, Fig. 11, of secondary 73 and the tan $(b)$ as determined by wiper 62, this latter value being negative in sign as explained above. The mixing resistances 84 and 86 and amplifier 88 supply to the line 89, Fig. 12, a signal value proportional to cos $(a+b)$.

The following table illustrates the double function performed by the quadrant converter switch 103, Fig. 12. In the following table, the line 82 carries a signal of sin $(a+b)$, line 89 carries a signal of cos $(a+b)$, 34 is the resolver coil, Fig. 16 to receive values according to sin (a), and 35 is the resolver coil to receive signal values according to cos (a).

WINDING OF RESOLVER 37, FIG. 16

| Quadrant | 34 | 35 |
|---|---|---|
| 1 | +82 | +89 |
| 2 | +89 | −82 |
| 3 | −82 | −89 |
| 4 | −89 | +82 |

Switch 103, Fig. 12 includes a stepping magnet 90 having wipers movable to the four positions shown. Wiper 91 controls connection with the contacts C1 to C4. Wiper 92 which is in circuit with the relay coil 93 moves to seek the potential of battery indicated at 24 in Fig. 7 and controls the connection of the bank of contacts Q11 to Q14. The remaining wipers 94, 95, 96 and 97 control the connections of lines 82 and 89 to coils 34 and 35 to ground 98, Fig. 12 in the four quadrants as shown by the above table, thus performing the double function of deciding on the sign of the sine current in line 82 and the cosine current in line 89, and also deciding on the assignment of these two currents to the quadrature coils 34 and 35, as described above.

Wipers 94 to 97 of the quadrant converter switch 103 control contact banks 194 to 197 respectively, these banks being cross connected and connected to lines 82 and 89 and to ground 98 as shown and for the purpose above explained.

To consider the operation of the switch 104, Fig. 9 in further detail, the particular one of the wipers C11 to C14 which is in circuit at any one time, as selected by wiper 91, seeks the potential of battery 42 controlled by wiper 17 of switch 102, Fig. 7 to determine the level at which the relay 41 of stepping magnet 40, will stop the advance of this switch 104. The wipers C11 to C14 correspond to the quadrants Q1 to Q4 respectively. Wipers C11 to C14 respectively control connection with contact banks 111 to 114. The slant connections like 115 from the 0° contact in bank 111 to the 10° contact of the next bank 112, in effect add 10° to the level at which each succeeding quadrant line, such as the one connected to wiper C12, will find the potential to operate the relay 41, to stop the advance of switch 104. For example, if we assume that the input information calls for a shaft rotation of 80°, which is in the first quadrant, wiper 3 of switch 101 will be at 0°, and wipers 12 to 17 of switch 102 advance to the 80° level, and as wiper C11 of switch 104 is now effective, it will advance to the 80° level of switch 104, as required, as stepping magnet 40 finds the potential of battery 42 at the 80° level of its switch 104, via lead 108, this circuit being completed through line 28, contact C1, cable 27 to wiper C11. At this time the quadrant converter switch 103, Fig. 12 is in its first quadrant position with wiper 92 on contact Q14, as relay 93 is thereby connected through cable 29, line Q1, wiper 13, wiper 4 and battery 24.

If we now assume that the input information calls for 90°, wiper 3 of switch 101, Fig. 7 is still at 0°, and wipers 12 to 17 advance to the 90° level of switch 102. Wiper 17 now connects its battery 42 by way of line 116 stepwise to the third contact of bank 114 and to the second contact of bank 113, and to the first contact 117 in the bank 112. With 24 volts of source 42 on contact 117, switch 104 remains with its wipers C11 to C14 at the first level, but the sine of 90° is 1, not 0 as is now picked off at wiper C15, and the cosine of 90° is 0 not 1 as picked off by wiper C16 at 0° level. These values are interchanged, that is, the trigonometric functions in lines 82 and 89 are interchanged with respect to the quadrature coils 34 and 35, as switch 103 advances to its second quadrant position, as its stepping magnet 90, like the other stepping magnets, is self-acting until its relay 93 finds 24 volts of source 24, Fig. 7 which it does through wiper 92, contact Q13, cable 29, second quadrant line Q2, strap connection 32, contact 31, wiper 13, wiper 4 to source 24. With switch 103 in its second quadrant position, the sine signal value in line 82 is now supplied to the cosine coil 35, while the cosine signal value in line 89 is supplied to the sine coil 34, as described in connection with the above table. Switch 103 remains in its second quadrant position for the following example of an input of 100°.

Again, assume that the input information calls for a shaft rotation of 100°. Switch 101 advances to its 100° level, while switch 102 is at the 0° level. Battery 24 now finds a circuit through wiper 4, contact 119, wiper 14, line Q2, cable 29, contact Q12, relay 93 to ground 120, whereby wipers 91, 92 and 94 to 97 advance to the second quadrant position. Ground 39 at relay 41 is thus connected through line 28 to contact C2, cable 27 and wiper C12 which moves to its contact 121 at the 10° level of its switch 104, battery 42 being advanced by connection 115 from the 0° level of switch 102 to the 10° level of the second quadrant bank 112 of switch 104 as explained above. Hence the input information of 100° is transmitted by wiper C15 of switch 104 as the sine of 10° and is transmitted by wiper C16 as the cosine of that angle, the second quadrant position of switch 103 performing the double duty of deciding the sign of the signal values and also their assignment to the resolver coils 34 and 35 in accordance with the above table.

Figure 8:
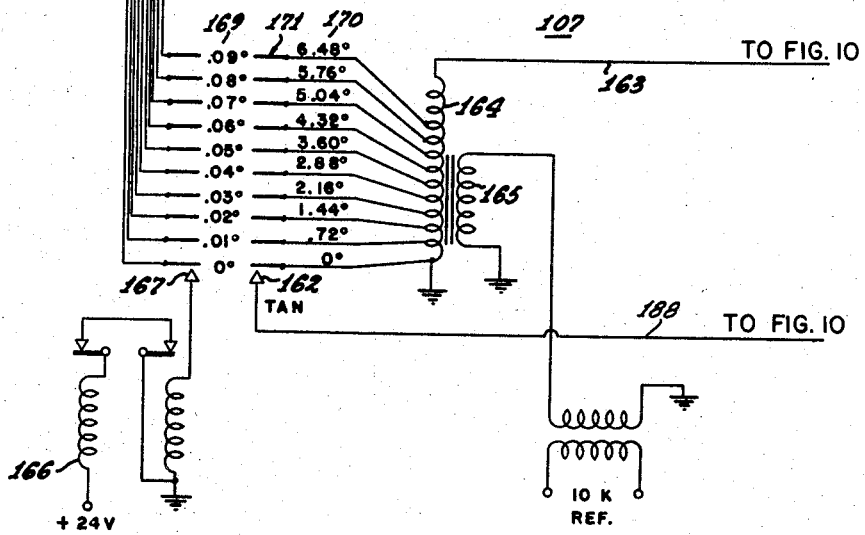
Figure 10:
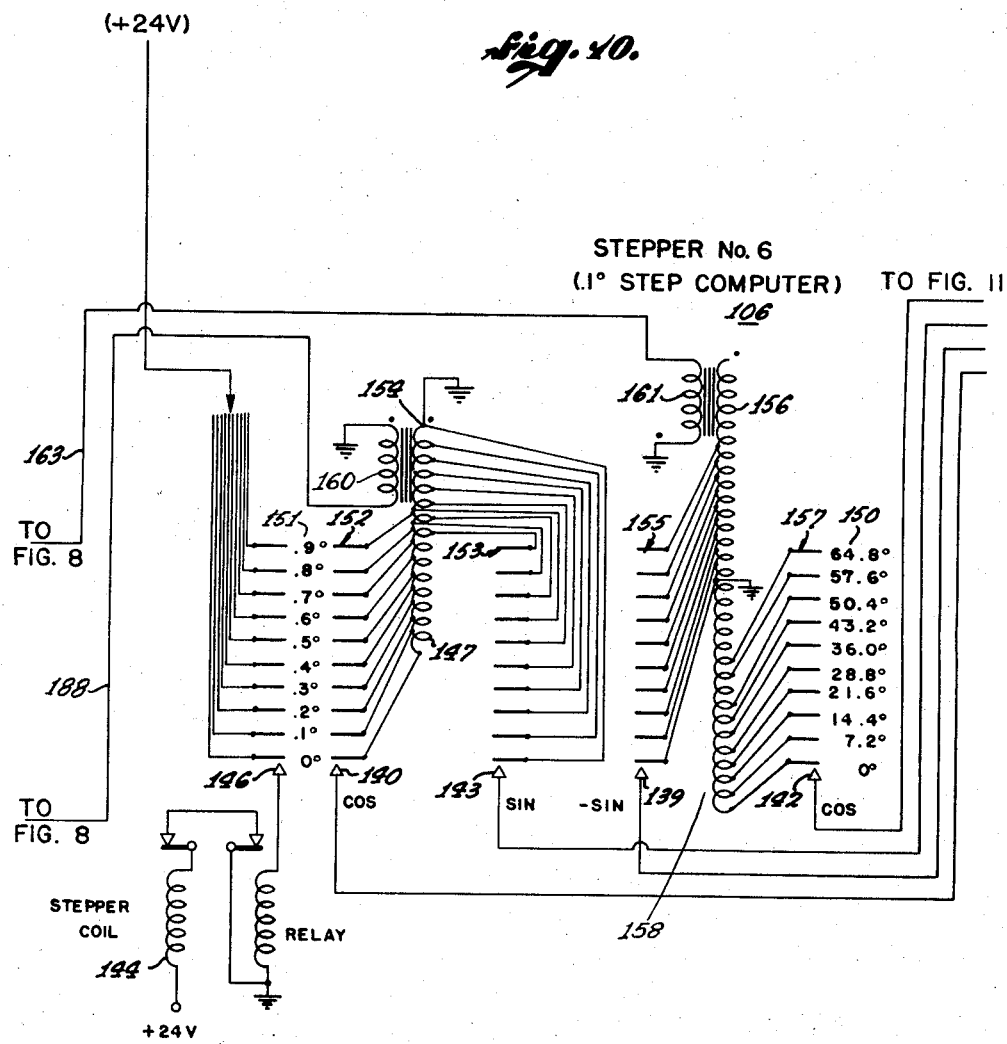

Wiper C11 operates for input information from zero to 80°; wiper C12 operates from 90° to 170°; wiper C13 operates from 180° to 260°; and wiper C14 operates from 270° to 350°, the units value of the degrees being determined by switch 105 Fig. 11, while the first decimal digit is determined by switch 106, Fig. 10 and the second decimal digit is determined by switch 107, Fig. 8.

It is believed that the operation of switches 102, 103, 104 and 105 for values in other quadrants will be apparent from the above explanation which proceeds to the description of the signal values supplied to the fine data element 68.

Referring to Fig. 16, the fine data element 68 has a rotary coil 129 which assumes a position determined by the sum of the angles determined by the input information supplied to switches 105, 106 and 107. Data element 68 has quadrature coils 131 and 130, the former receiving values according to the sine of the sums of the angles in question, while the coil 130 receives signal values according to the cosine of the sums of those angles. Coarse data element 37 may be a conventional 2 pole resolver, while fine data element 68 may be an inductosyn and have a much larger number of poles, such as 144.

Referring to Fig. 11, switch 105 has a contact bank 132 for wiper 64 and contact banks 133, 134 and 135 for wipers 65 to 67 respectively, as well as contact banks 71, 72 and 74 referred to above. The banks 132 to 135 are connected to taps on the transformer secondary windings 136 and 137 shown, to pick off various sine or cosine values of the electrical wave as shown. Winding 136 has a primary winding 138 connected to wipers 139 and 140 of switch 106, while winding 137 has a primary 141 connected to wipers 142 and 143. Switch 106 has a stepping magnet 144, controlled by the digital input information in the block 145, Fig. 1 which designates the angular position of shaft 8, Figs. 16 and 17 in terms of tenths of a degree. Referring to Fig. 10, stepping magnet 144 moves its wiper 146 to the level selected by the input information in block 145, Fig. 1 to therefore move wiper 140 to a level to pick off a signal value corresponding to the cosine of the corresponding angle of the electrical wave as indicated in the column 150, at the right hand side Fig. 10, bearing in mind that each .1° of shaft rotation as represented in column 151 corresponds to 7.2° of electrical wave of the data element 68 which has 72 cycles. Wiper 140 picks off a value of the cosine of the electrical wave shown in column 150, corresponding to the shaft angle called for as shown in column 151. Wiper 143 picks off a signal value corresponding to the sine of the electrical wave and wiper 142 picks off a value corresponding to the cosine of the electrical wave. Wiper 140 controls the contact bank 152 connected to appropriate taps of the secondary coil 147. Wiper 143 controls the connection to a contact bank 153 connected to appropriate taps on the secondary coil 154. Wiper 139 controls the connection to a contact bank 155 connected to taps on the secondary coil 156 and wiper 142 controls a contact bank 157 connected to taps on the secondary coil 158. The heavy dots adjacent to secondary coils 154 and 156 indicate that one of them is reversed with respect to the other to obtain the proper sign of the trigonometric function referred to below. Secondary coils 147 and 154 are fed by a primary winding 160 while secondary coils 156 and 158 are fed by a primary winding 161.

Primary 160 is connected by conductor 188 to the wiper 162 of switch 107 and primary 161 is connected by a line 163 to one end of a secondary coil 164 which is supplied with a suitable reference voltage such as 10 kc. by a primary winding 165.

Referring to Fig. 8, switch 107 has a stepping magnet 166 which moves its wipers 167 and 162 to the level determined by the hole in the card in block 168, Fig. 1 which contains the digital input information in terms of hundredths of a degree of the desired shaft rotation which is indicated by column 169, Fig. 8 the corresponding electrical wave of the fine data element 68 being shown in column 170.

Wiper 162 makes connection with contact bank 171 connected to secondary winding 164 in proportion to the tangent of the electrical wave from zero to 6.48°, in steps of .72°.

If we assume for the moment that the angle selected by switch 107 is represented by ($b$) and that the angle selected by switch 106 is represented by ($a$), then the windings 138 and 141, Fig. 11, will receive signals proportional to the sine and cosine of the sums of these angles for the following reasons:

$$\text{Sin } (a+b) = \sin a \cos b + \cos a \sin b \quad (1)$$

$$\text{Cos } (a+b) = \cos a \cos b - \sin a \sin b \quad (2)$$

If we divide both of the above equations by cos ($b$), the right hand sides of these equations become:

$$\text{Sin } a + \cos a \tan b \quad (3)$$

$$\text{Cos } a - \sin a \tan b \quad (4)$$

The electrical analog of Equations 1 and 2 is used in switches 105 and 106 where the angle of the electrical wave is large. A saving in the number of switch elements is effected by using the electrical analog of Equations 3 and 4 in switch 107 where the angle of the electrical wave is smaller, without affecting the operation of the fine data element, 68, as its rotary winding 129 assumes a vector position which depends on the ratio of the signal supplied to its quadrature windings 130 and 131, not on the absolute value of those signals.

The product terms in all of the above equations are picked off by supplying to a transformer a value according to one term and by tapping off a selected portion of the secondary voltage in accordance with the second term, while the sign is determined by the manner in which the circuits are connected as referred to above.

The features of (1), overlapping the operation of data elements which operate at different speeds, (2), a converter which computes the trigonometric function for the sum of the angles called for by the digital information, such trigonometric functions being employed for energizing the quadrature windings of the coarse and fine data elements, and (3), stepping switches controlling the analog voltages, are described and claimed in the following patent application generically, such application specifically disclosing the use of these features as applied to converting digital input information in terms of linear distance into analog voltages representing the corresponding linear position of a driven element such as a machine slide: for Automatic Machine Control, filed in the name of Robert W. Tripp, and assigned to the assignee of the present application, Serial No. 540,429, filed Oct. 14. 1955.

Referring to Fig. 11, primary winding 138 receives a signal proportional to the sum of the shaft angles selected by switch 106, Fig. 10 (angle $a$) and switch 107, Fig. 8 (angle $b$), corresponding to the values shown in Equation 3, the value sin ($a$) being picked off by wiper 139, primary 161 receiving a unity value of voltage, while wiper 140 picks off the value of cos ($a$) from a particular tap in bank 152, this voltage being multiplied by the value of tan ($a$) supplied to primary winding 160, as picked off by wiper 162. The primary winding 141 receives a signal value proportional to cos ($a+b$) as shown by Equation 4, as the wiper 142 picks off a value proportional to cos ($a$), and wiper 143 picks off a value proportional to sin ($a$) from one of the contacts in bank 153 and multiplied by tan ($a$) supplied to primary winding 160.

The various taps shown in Fig. 11 are taken out from secondary winding 136 to the bank 132 of switch 105 so that the steps of 1° of shaft rotation find their electrical equivalent in the cosine value of the electrical wave. The steps of the electrical wave for secondary windings 136 and 137 are 72°, being one tenth of this or 7.2° at bank 157 of switch 106 and being .72° at bank 170 of switch 107. The corresponding sine value of the electrical wave in steps of 72° is connected to the contacts of the bank 133, the sine steps are connected to contact bank 134 and the cosine values are connected to the steps of bank 135, with reversal of sign in one of the circuits as explained below. Now assuming that ($a$) represents the shaft angle determined by both of the switches 106 and 107, while ($b$) represents the shaft angle called for by the setting of switch 105, it will be apparent that the coils 131 and 130 are respectively supplied with current proportional to the sine and cosine of the sum of those angles for the following reasons.

Line 180 Figs. 11 and 16 which connects wiper 64 to one terminal of inductosyn coil 131 carries a value of cos ($b$) picked off by wiper 64 from transformer coil 136 and multiplied by sin ($a$) supplied to primary 138. Line 181 Figs. 11 and 16 which connects wiper 65 to the other terminal of coil 131 picks off a value of sin ($b$) multiplied by cos ($a$) supplied to primary 141. The sum of signals according to the above terms corresponds to Equation 1 above, so that inductosyn coil 131 receives a signal value proportional to sin ($a+b$). Line 182 Figs. 11 and 16 connects wiper 66 to one terminal of inductosyn coil 130 and picks off a value of sin ($a$) sin ($b$) while line 183 Figs. 11 and 16 connected to the other side of that coil picks off a value of cos ($b$) cos ($a$). The voltages in lines 182 and 183 are both taken on a similar side of secondary windings 136 and 137 with respect to ground and hence these values are subtracted, whereby the current in the lines 182, 183 corresponds to Equation 2 above. Inductosyn coil 130 thus receives a signal value proportional to the cosine of the sum of the angles in question.

As explained in detail in the above-mentioned patent application, S. N. 540,429 both sine and cosine values, with proper regard to plus or minus values, are taken from the same secondary winding 136, Fig. 11 and the same applies to the secondary winding 137, by wipers 64 to 67 of the switch 105, Fig. 11, by providing these windings with five taps, in steps of 18°, on opposite sides of its mid-tap. The fine data element 68 has a repeating cycle of 5°, and input information for it is obtained from stepper 105 along with the information for the coarse resolver 37. Since the steps of switch 105 are 1° of shaft rotation, the voltages obtained from wipers 64 to 67 must correspond to the sine and cosine of the coupling wave of fine data element 68, with 72 degree steps, as data element 68 in having 144 poles has 72 cycles per revolution of shaft 8. This means that stepper 105 will go through ten times 72° or 2 cycles of variation over its complete range of ten 1° steps of shaft rotation. The circuit diagram of Fig. 11 shows how this is accomplished by making use of correctly tapped transformer winding 136, 137, and the four banks of contacts 132 to 135 on stepper 105. The degree numbers on the taps of windings 136 and 137 correspond to the sine of the angle with the algebraic signs giving the sense of the voltage generated at that point.

The following table gives the relation between the contacts of banks 132 to 135 with reference to shaft rotation, and the electric wave of the fine data element 68.

| Contacts of banks 132-135 with reference to shaft rotation | Wave of fine data element 68 |
|---|---|
| Degrees | Degrees |
| 0 | 0 |
| 1 | 72 |
| 2 | 144 |
| 3 | 216 |
| 4 | 288 |
| 5 | 360 |
| 6 | 432 or 72 |
| 7 | 504 or 144 |
| 8 | 576 or 216 |
| 9 | 648 or 288 |

In Fig. 11, referring to the contact bank 132, the 0° contact is in multiple with the 5° contact as cosine 0°=cosine 360°, and both of these contacts are connected to the +90° terminal of winding 136, as cosine 0°=sine of 90°. The 1° contact of bank 132 is in multiple with the 4° contact and with the 6° contact and with the 9° contact, as the corresponding electric waves, namely, 72°, 288°, 432°, and 648° all have the same cosine value as 72°, which in turn is the same as the sine of 18°, the terminal for which on winding 136 is connected to the four contacts mentioned. The 2°, 3°, 7°, and 8° terminals of bank 132 are connected in multiple as they all have cosine values the same as cosine 144° which in turn is the same as −sin 36°, these contacts being connected to the corresponding negative terminal of winding 136. It will be apparent that various other taps shown for winding 136 supply the sine values for bank 134. In a similar manner, the sine and cosine values for banks 133 and 135 are obtained from taps on winding 137.

Switch 105 overlaps the operation of the coarse data element 37 and the fine data element 68, in designating the same amount of rotation of shaft 8 at each of its unit steps.

Referring to Fig. 16, the error signal in the output circuit 122 of the coarse data element 37 may be employed in the usual servo system as shown wherein this signal is amplified by servo amplifier 123, and supplied to motor 124 which drives the shaft 8 to reduce this error signal to null. When the error signal in the output 122 reaches a suitable small value, switch 125 operates to switch the output circuit 126 of the fine data element into control so that its error signal determines the fine angular adjustment of shaft 8. For further details of a switch like 125 and a servo circuit which may be used, reference may be made to pages 81 to 88 and elsewhere of the following book: Vol. 25, Radiation Laboratory Series, "Theory of Servo-Mechanisms" by James et al., published 1947 by McGraw-Hill Book Co., pages 81–88 define "speed" and disclose a "synchronizing" circuit for dual-speed which may be used here. Also, this book discloses known servo techniques which may be used.

At this point, and before proceeding with a description of the curvature converter, a description will be given of (a) the shaft output of the slope motor 124 in Fig. 16, and (b) the program advance with the manual push button or advance switch PB1 used for starting or advancing, and the resulting supervisory control exercised by relay R1 over the feed rate drive motor M3 in Fig. 13.

(a) *Shaft output of motor 124.*—The shaft S5 of this motor is one input, and shaft S6 from the curvature integrator of Fig. 15 is another input, for the differential gear DG1, the speed of its output shaft 8 being the sum of the speeds of its two inputs. A similar differential gear device is shown in Fig. 15 in the output of the curvature motor, and in Fig. 18 at DG2 and DG3 in the controls for the X and Y machine drives. The construction and operation of this differential gear is well known. See for example page 12 of the reprint from "Machine Design," referred to above. Thus, if the contour to be cut on the workpiece involves only slope, input S6 is zero, whereas, for more complex contours, the output 8 equals the sum of S5 and S6, which means that slope is controlled by curvature, and in connection with Fig. 15 and others, it will be shown how curvature is, in turn, controlled by the next higher order component, namely, rate of change of curvature.

(b) *Program advance and supervisory control of feed rate.*—In Fig. 16, the error signal circuit from switch 125 to motor 124 is shown as a single line, a complete circuit being understood and well known. The normally open push button PB1 makes it possible to select the moment when the shaft 8 shall be adjusted as called for by the slope angle input D4, and in cooperation with the relay R1, the safeguard is provided that the feed rate drive from motor M3 in Fig. 13 shall remain idle while shaft 8 is seeking the position called for by its slope input control, the disabling of the feed rate drive by relay R1 being discontinued when the error signal from switch 125 is null, with shaft 8 properly positioned as called for by its input slope data. When switch PB1 is closed, the error signal, if present, flows through amplifier A10 and coil 200 to ground 201, operating relay R1 and moving its swingers 202 and 203 to positions alternate of that shown. The error signal then divides at swinger 202, flowing through amplifier 123 to operate motor 124, and also through amplifier A10 to hold relay R1 operated as long as the error signal is present, and control the feed rate drive as required, as relay R1 while operated holds its swinger 203 open, to open the circuit from 24 volt source 204 to line 205 leading to feed rate relay R2 in Fig. 13. Motor 124 operates until the error signal is null.

CURVATURE CONVERTER

After describing this converter, a description will be given of the control exercised by its switch PB2 over the feed rate motor M3 in Fig. 13, this control being similar to the control described above in connection with push button PB1.

Figure 6:
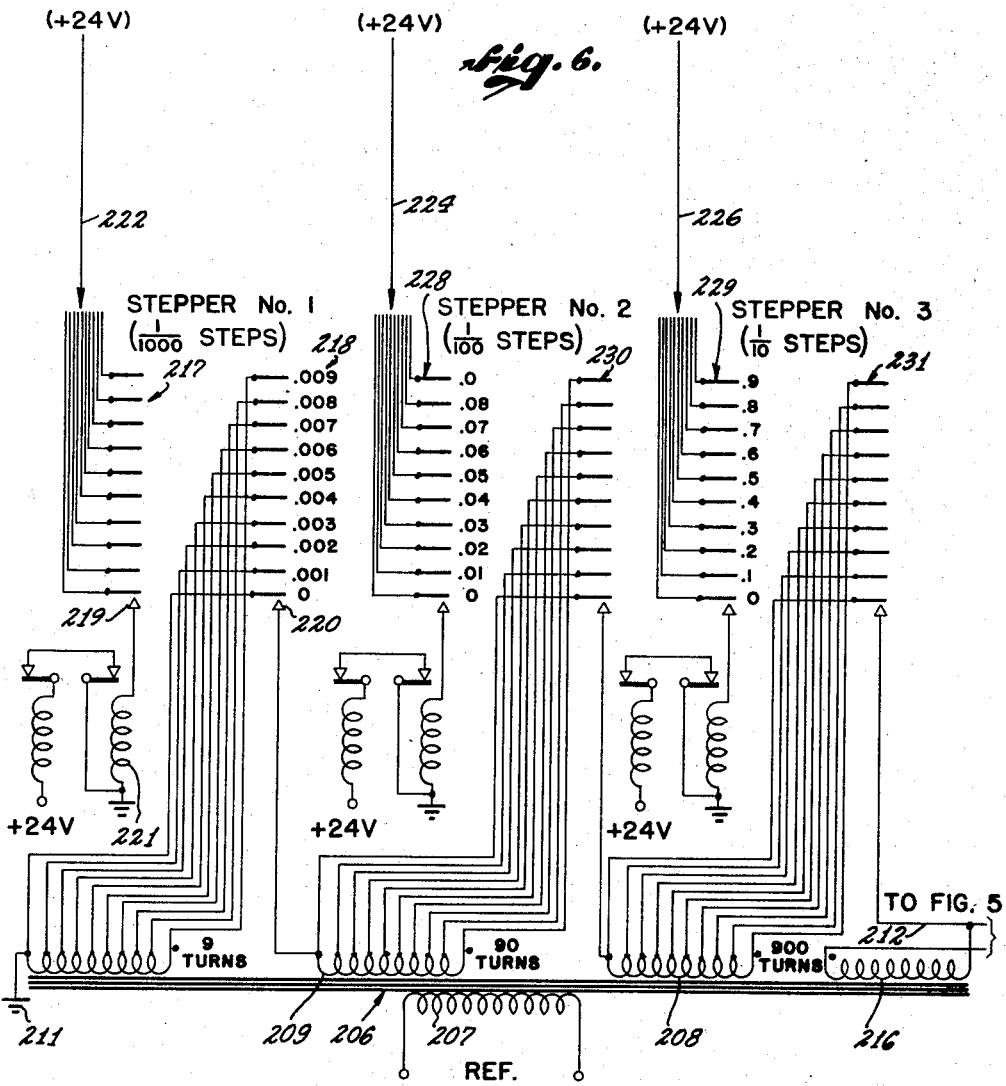
Fig. 6 is a schematic circuit drawing of steppers for converting the input curvature data into an electrical signal for controlling the curvature integrator of Fig. 15.

The curvature input D3 in Fig. 1 feeds the converter in Fig. 6 to operate the curvature motor M4 in Fig. 15 and position the ball slide 214 of the curvature integrator 215 as called for by the input data. See page 30 of the above mentioned reprint from "Machine Design" for a description of the ball integrator.

The digital input D3 for curvature is a decimal number that can vary from zero to .999 or more. This quantity is used to establish the position of shaft S7 of the curvature motor M4 as an input to the differential gear DG4 in Fig. 15. The invention provides for converting this decimal number into an analog voltage, where the voltage is directly proportional to the number itself.

Fig. 6 shows a typical circuit for accomplishing this linear digital-to-voltage conversion. In this circuit, stepping switches marked steppers #1, 2 and 3, like the angular data stepper #1 in Fig. 7, are again used, being arranged to follow the information on the card reader or other input equipment for the decimal, digital input D3 in Fig. 1. Thus, the positions of the contacts on the three stepping switches #1, 2 and 3 in Fig. 6, will correspond to the number on the card or other input device.

Each of the steppers in Fig. 6 has a stepping magnet and relay like 221 to advance its two wipers like 219 and 220 to the level or contact in a bank like 217 to which 24 v. is applied by the feeler brush of the input D3, wiper 220 picking off a corresponding voltage from its bank 218. The lines 222, 224 and 226 represent the ten conductors from the banks 217, 228 and 229 to their respective input blocks 223, 225 and 227 in Fig. 1. A reference source of voltage, not shown, is provided for the primary winding 207 of transformer 206.

The second bank of contacts 218, 230 and 231, on each stepper in Fig. 6, is used to switch in a voltage proportional to the number of that point on the bank. These voltages are obtained from a tapped transformer 206 of appropriate ratios. In Fig. 6 the $\frac{1}{10}$ step stepper #3 is shown connected to a winding 208 of 100 turns per step or 900 turns in all. This turn is connected in series with the $\frac{1}{100}$ stepper #2 having 10 turns per step or 90 turns in all, which is again in series with the $\frac{1}{1000}$ stepper #1 having 1 turn per step or 9 steps in all. Thus the total number of turns on the transformer secondary windings 208, 209 and 210 that are connected in series is proportional to the number set up on the steppers 1, 2 and 3 in response to the particular decimal digits determined by the holes in the card or input D3. This will then yield, between ground 211 and line 212, a voltage proportional to the number on the input card D3 or other input device.

It is necessary to position a slide proportional to the above input number. This is accomplished by arranging the variable resistor 213 in Fig. 15, to be driven by the ball slide 214 of the curvature integrator 215, this variable resistor 213 having a reference voltage impressed across it from the winding 216 on this same transformer 206. The complete circuit is then so connected that the voltage across (a) the movable contact 217', Fig. 15, at times connected to ground 218', and (b) one end of the resistor 213, is subtracted from the voltage generated by the stepping switch-transformer combination between ground 211 and line 212. Thus there is a position of the variable resistor 213 that will yield a difference voltage equal to zero and this position is the desired mechanical output of ball slide 214 if proper scale factors have been maintained in the design of the electrical circuit and mechanical linkages. The desired mechanical position, corresponding to the curvature input, is obtained by means of the curvature servomotor M4, Fig. 15, controlled from the difference voltage of this circuit 211, 212, 213 and 218'. The servo controller is arranged to drive the curvature motor M4 in such a direction as to reduce the difference voltage in the normal manner common to the servo art.

Tapped resistors can be used instead of the tapped transformer 206 shown in Fig. 6 and either D. C. or A. C. voltages can be used in the comparison circuit as convenience and type of equipment dictates.

RATE OF CHANGE OF CURVATURE TRANSLATOR

Figure 3:
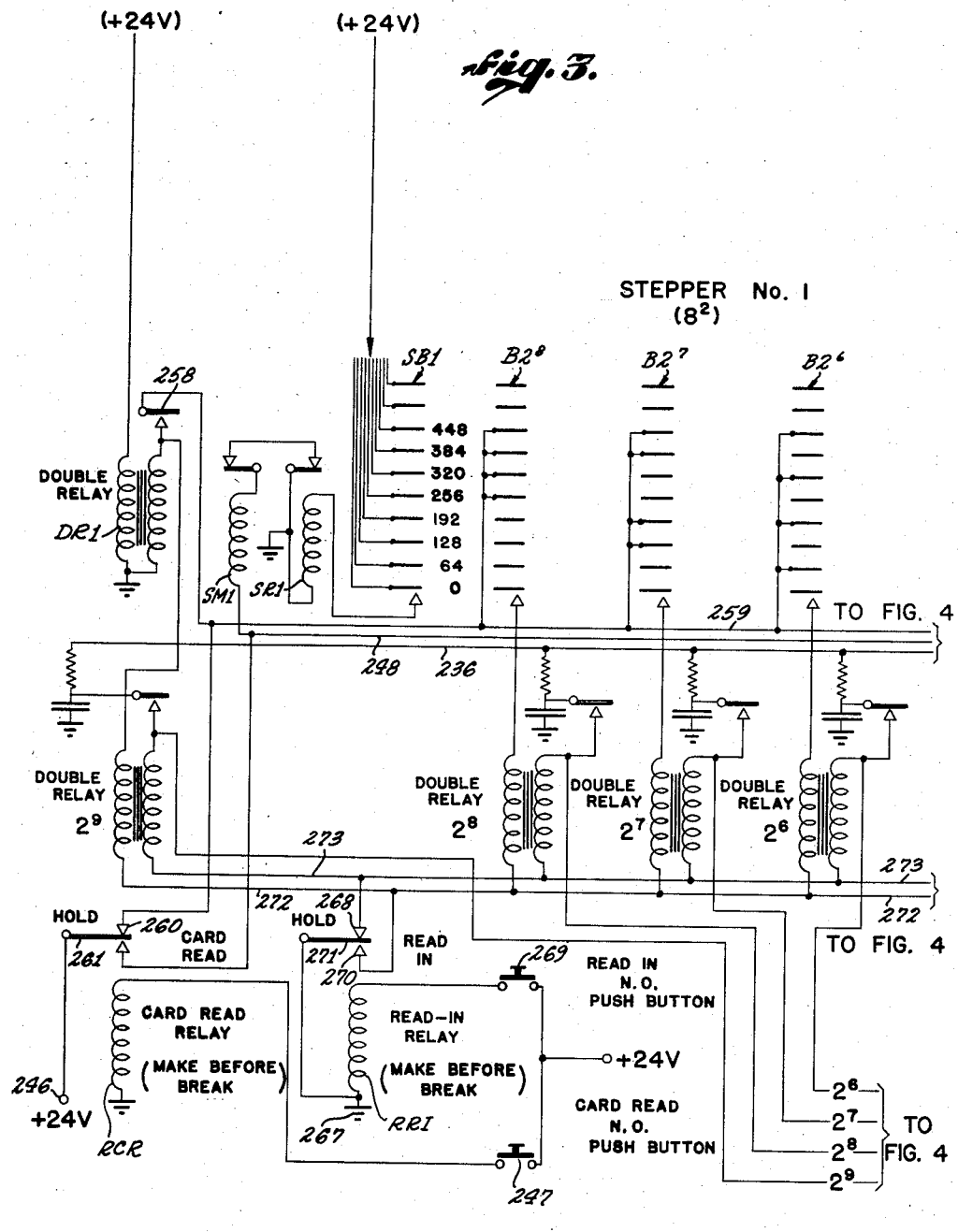
Figure 5:
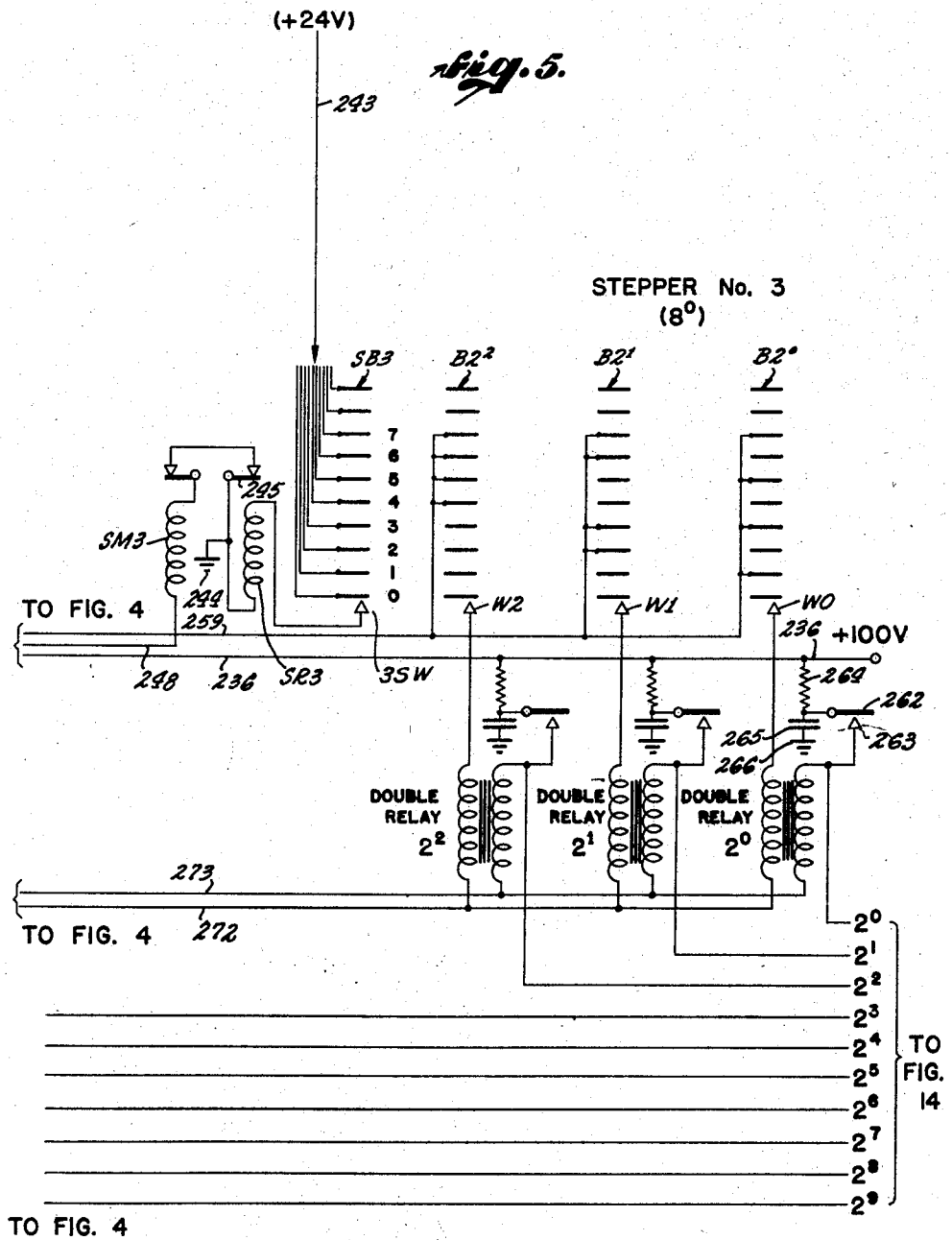
Figure 14:
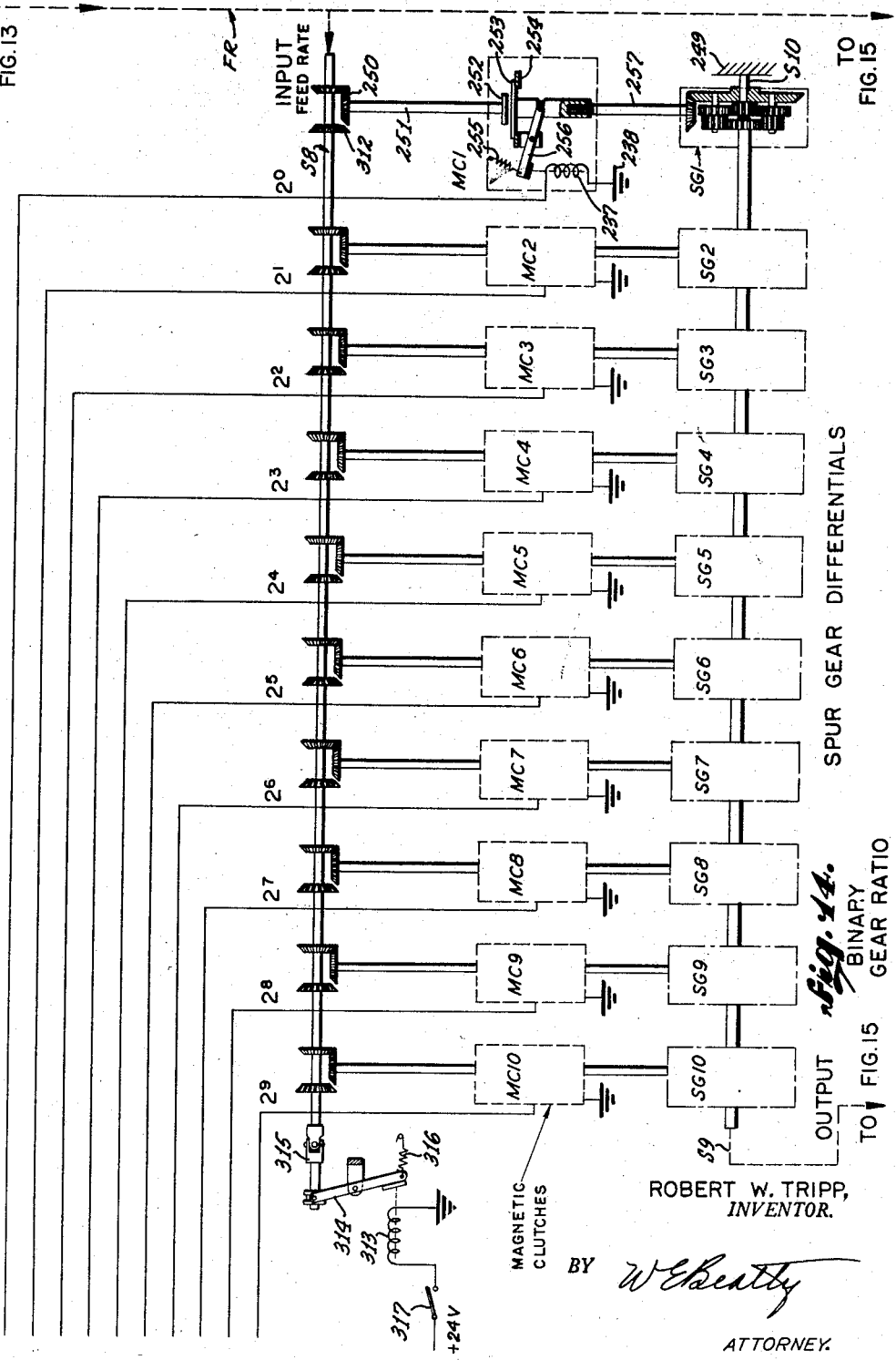
Fig. 14 is a schematic drawing of a binary gear ratio for accepting binary input data and for converting the same into variable output shaft speed, according to the binary bits of the input.
Figure 46:
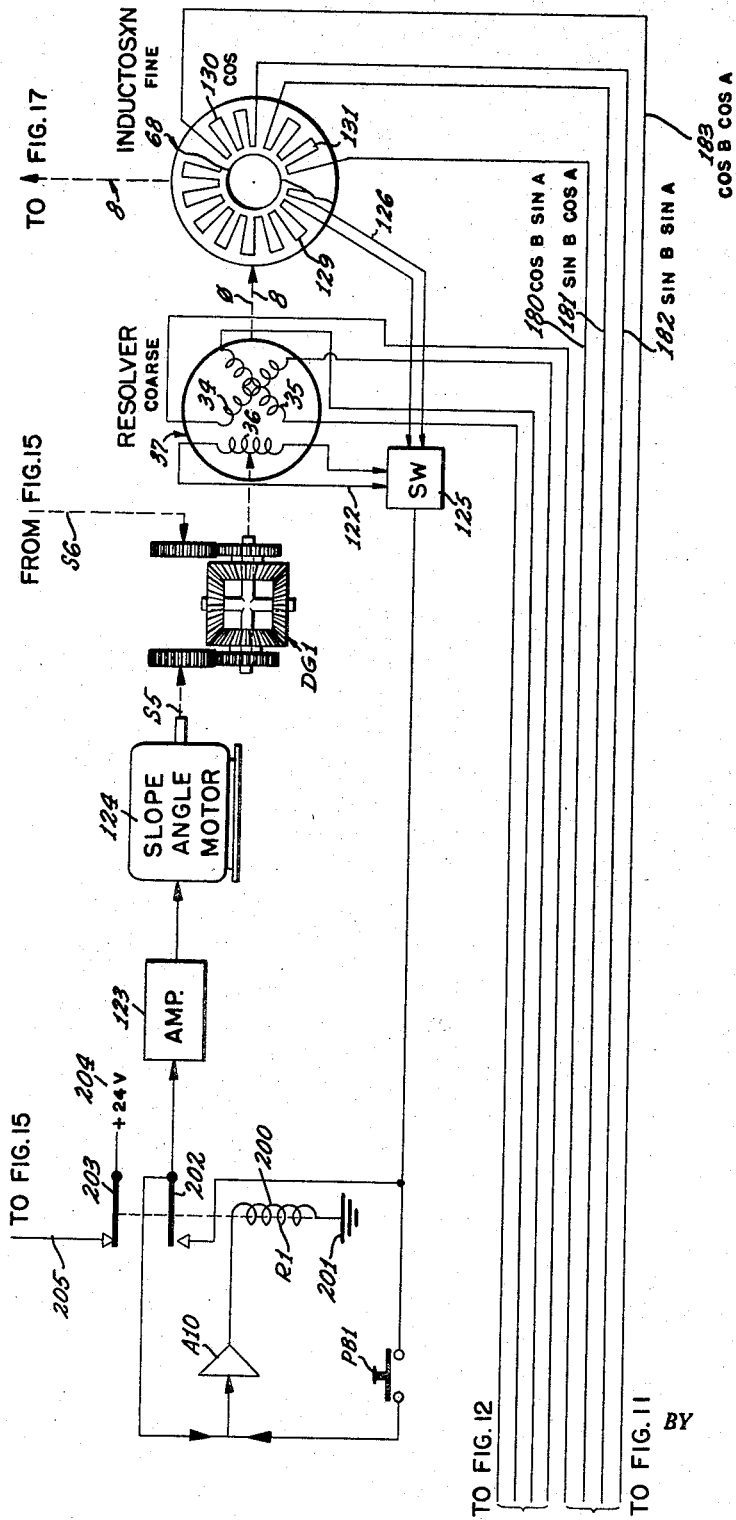
Figure 49:
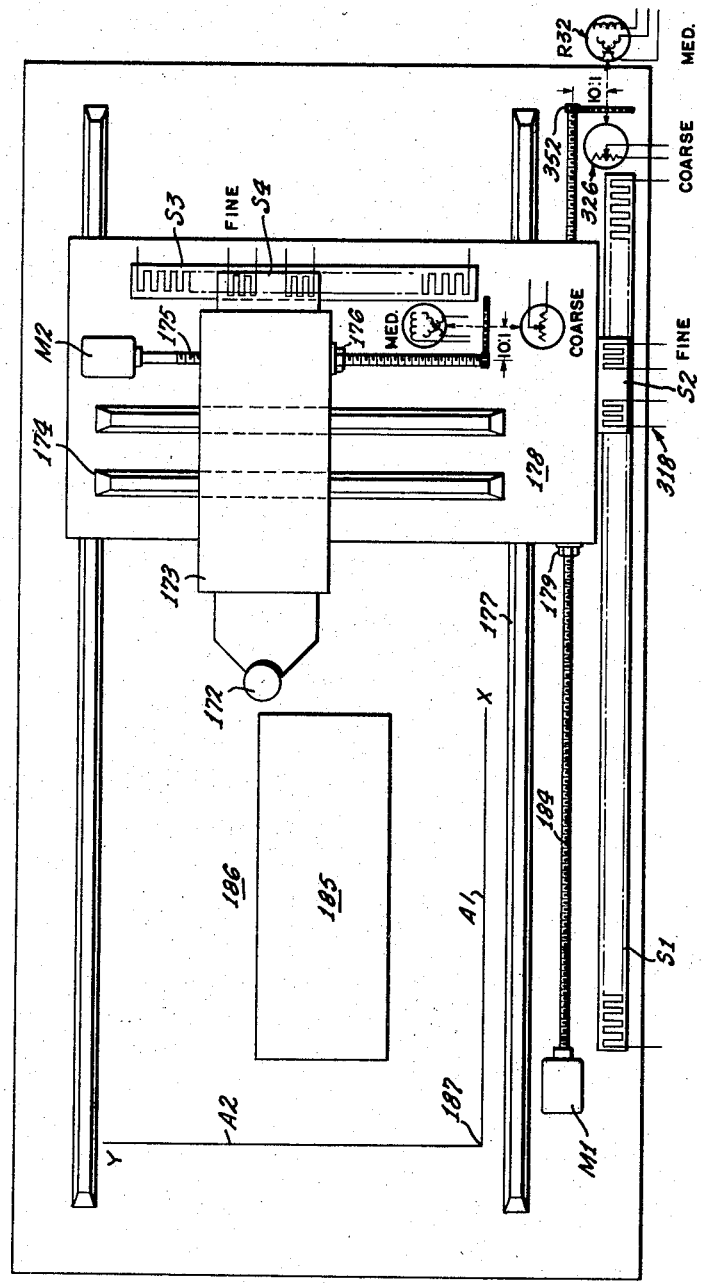

The octal input D2 in Fig. 1 feeds the rate of change of curvature data, as set up in four columns on the card, to the octal-to-binary translator of Figs. 3, 4 and 5 which supplies the resulting binary values to the binary gear ratio of Fig. 14, to drive its output shaft S9 at a speed determined by the input D2. The speed drive of shaft S9 forms an input to the differential gear DG4 in Fig. 15. The sequence of operation of the binary gear device in relation to the program advance involves transferring the input data on the card to the stepping switches, and the transfer of the decoded binary information on the steppers to holding circuits, to make such control available for quick speed change, while releasing the steppers to receive the next data. The following description of these features includes (a) octal-to-binary translator, (b) differential gear ratio, and (c) sequence of operation of the binary gear device in relation to the program advance.

(a) *Octal-to-binary translator.*—The term "octal" applies to a system of numeration having a base or radix of 8. The general formula is $(0 \text{ to } R-1)R^n$. Substituting 8 for R and using values from zero to 3 for "$n$," there results the octal digital groups shown in the blocks 232 to 234 of the input D2. By selecting a hole in the card in each of these three octal groups, and a hole in the binary group 235, resulting in a total of four holes, it is possible to select any one of 1023 speeds of shaft S9. This will be apparent from the following table which is also useful in explaining how the steppers #1, 2 and 3 in Figs. 3, 4 and 5 are wired to convert the octal input to these steppers to their binary output.

Table

|  | Octal | Binary | Decimal |
|---|---|---|---|
| Stepper #3 | 8 ($8^0$) | $2^0$ | 1 |
|  | 2 ($8^0$) | $2^1$ | 2 |
|  | 3 ($8^0$) | $2^0+2^1$ | 3 |
|  | 4 ($8^0$) | $2^2$ | 4 |
|  | 5 ($8^0$) | $2^0+2^2$ | 5 |
|  | 6 ($8^0$) | $2^1+2^2$ | 6 |
|  | 7 ($8^0$) | $2^0+2^1+2^2$ | 7 |
| Stepper #2 | 1 ($8^1$) to 7 ($8^1$) | $2^3$ to $2^3+2^4+2^5$ | 8 to 56 |
| Stepper #1 | 1 ($8^2$) to 7 ($8^2$) | $2^6$ to $2^6+2^7+2^8$ | 64 to 448 |
| Double Relay DR1 | 1 ($8^3$) | $2^9$ | 512 |

In the above table, the equivalent octal, binary and decimal values appear on the horizontal lines. The octal group of digits handled by stepper #3 is shown in full, while only the highest and lowest values are shown for stepper #2 and stepper #1. In the $8^3$ group, one has the choice of this value or zero, handled by the double relay DR1, resulting in a choice of speeds in unit steps from 1 to 1023. For most purposes, this would be sufficient, although another stepper can be used in place of relay DR1, if desired.

In the "stepper #3" section of the table, different combinations of the binary values $2^0$, $2^1$, $2^2$, are shown for the decimal values from 1 to 7, and the output of stepper #3 in Fig. 5 has three lines marked with these same three binary values, and when the corresponding one or more of the similarly marked double relays in Fig. 5 are energized, this connects 100 v. on line 236, Fig. 5, through the clutch coil like 237 and ground 238, see Fig. 14, of the similarly marked clutch circuit for the binary gear ratio of Fig. 14. Thus the stepper #3 responds to a hole in block 232 to control the binary outputs and clutch circuits in different combinations of $2^0$, $2^1$, $2^2$, to operate shaft S9, Fig. 14, at speed values from 1 to 7.

In a similar way, stepper #2 in Fig. 4, has output lines of binary values $2^3$, $2^4$, $2^5$, which are energized in different combinations, by a hole in one of eight positions in block 233 to give speed values of shaft S9, in steps of 8, from 8 to 56. In like manner, stepper #1 in Fig. 3 has output lines of binary values $2^6$, $2^7$, $2^8$, which are energized in different combinations, by a hole in one of eight positions in block 234 to give speed values of shaft S9, in steps of 64, from 64 to 448. Of course, one or more of the steppers #1, #2 and #3, and/or the double relay DR1 can be used simultaneously to obtain speed values equal to the sum of one value from each of the four octal groups controlled by these four items. The maximum speed value obtainable from stepper #3 is 7; that from stepper #2 is 56, that from stepper #1 is 448, and DR1 when energized has a speed value of 512, the sum of these four maximum values being 1023, in accordance with the speed range as previously stated.

Figure 13:
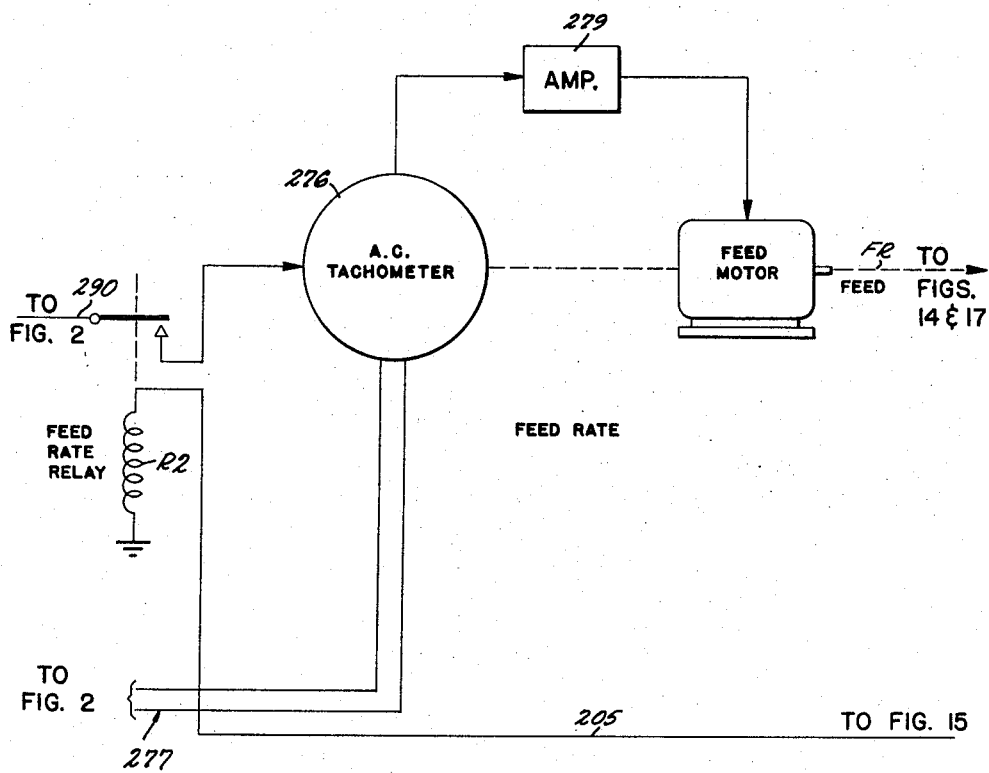
Fig. 13 is a schematic circuit drawing of the feed rate motor for driving a shaft for operating certain elements in Figs. 14, 15 and 17.

(b) *Differential gear ratio.*—As shown in Fig. 13, the feed motor M3 drives a feed rate shaft FR which forms an input to the binary gear ratio in Fig. 14. Magnetic clutches MC1 to MC10 connect the input shaft S8 to the output shaft S9 through spur gear differentials SG1 to SG10. The shaft output from each of these cells forms one input for the next cell on the left, each cell having a shaft input from the next one on the right except SG1, as its input shaft S10 is held or locked to ground as indicated at 249. The arrangement of all of the clutches and differentials is the same, only the one on the right being shown in detail, wherein shaft S8 is coupled by bevel gears 250 to shaft 251 having clutch plate 252 to be engaged by clutch plate 253 when coil 237 is energized, pivoted swinger 256 being operated by coil 237 against the action of spring 255. When coil 237 is idle, spring 255 holds clutch plate 253 on brake or ground 254, the input speed of shaft 257 to SG1 then being zero. Publications referred to above describe the construction of cell SG1, the remainder SG2 to SG10 being the same as SG1, and the use of these cells to obtain output speeds according to binary bits.

(c) *Sequence.*—Stepper #3 Fig. 5 has four sets of contact banks, SB3 having a wiper 3SW, bank $B2^2$ having a wiper W2, in circuit with the left coil of double relay $2^2$, bank $B2^1$ having a wiper W1 in circuit with the left coil of double relay $2^1$, and bank $B2^0$ having a wiper W0 in circuit with the left coil of double relay $2^0$. The switching bank SB3 determines the level to which all four of the wipers of this stepper will operate, as the feeler brush of the input puts 24 volts on line 243 leading to the pertinent contact in bank SB3, to stop the stepper at that level by operating stepping relay SR3 to open the circuit to ground 244 at its contact, assuming its stepping magnet SM3 to be active. A current source of 24 v. shown at the lower left of Fig. 3, renders all of the stepping magnets SM1, SM2, SM3 active when the card read switch 247 is operated, as this energizes the card read relay RCR, make before break, to move its swinger 261 to the alternate position and connect 24 v. through its contact 247 "card read" to line 248 forming the common or parallel connection for the live end of all of these stepping magnets. Hence, the input data on the card or other record can be read in and supplied to the stepping switches in Figs. 3, 4 and 5 at any desired point in the program.

Referring to the above table and to Fig. 5, it will be apparent that the numbers 0 to 7 appearing opposite the first eight contacts in the stepping bank SB3 represent two things, namely, the numerical value of the octal input on the corresponding contact at the left, and the binary equivalent thereof as shown by the binary circuits made active by the wipers W0, W1 and W2 at the corresponding levels. Thus, with all four wipers of this switch in their top position at the level 7, all three of the binary lines controlled by this switch are active and their combined value is $2^0+2^1+2^2$ which equals 7, the octal value of the stepping contact in bank SB3 at that level. In other words, in the binary bank $B2^2$, the contacts opposite 4, 5, 6 and 7 are connected in parallel because the binary value $2^2$ controlled by these contacts is a component of the above values, as shown by the table. For a similar reason, in binary switch $B2^1$, the contacts opposite 2, 3, 6 and 7 are connected in parallel as the binary value $2^1$ is a component of the corresponding numerical values, and in binary switch $B2^0$, the contacts opposite 1, 3, 5 and 7 are in parallel because $2^0$ i. e. 1, is a component of these values. The other contacts in the three binary banks just mentioned are not used, having no circuit connection, as shown.

The multiple connection of the contacts in the bank $B2^6$ of stepper #1 in Fig. 3 is the same as the multiple connection of the contacts in the banks $B2^3$ Fig. 4, and $B2^0$ Fig. 5. In like manner, the multiple connection of the contacts in the bank $B2^7$ is the same as bank $B2^4$ and $B2^1$; also, the multiple connection of the contacts in bank $B2^8$ is the same as in banks $B2^5$ and $B2^2$. The nine binary banks $B2^0$ to $B2^8$ in Figs. 3, 4 and 5 are thus identified by the letter "B" followed by that power of 2 which also represents the double relay and output line it controls, these double relays and output lines being thus marked in Figs. 3, 4 and 5.

All of the multiple contacts in banks $B2^0$ to $B2^8$, as well as the swinger 258 of double relay DR1 are connected in multiple to line 259 which is connected to the "hold" contact 260, namely, the back contact of swinger 261 of relay RCR.

Each of the double relays $2^0$ to $2^8$, pertaining to steppers #1, #2 and #3, Figs. 3 to 5, as well as double relay $2^9$ pertaining to double relay DR1 has a swinger like 262 as marked for double relay $2^0$, and a front contact 263 to connect the 100 v. on line 236 to the pertinent one or ones of the output lines $2^0$ to $2^9$ when the corresponding double relay is energized. Each swinger like 262 is connected between resistance 264 and a condenser 265, this condenser serving to give a high potential to quickly actuate the clutch coil in Fig. 14, the resistance 264 serving to reduce the current to a steady state value which is sufficient to hold the clutch energized. One side of each condenser like 265 is connected to ground as shown at 266. The number translated from octal to binary by the stepping switches Figs. 3 to 5 is read from these stepping switches into the pertinent double relays by energizing the "Read-in" relay RRI, on operating the push button or program advance switch 269, in Fig. 3. This connects the left coil of the pertinent double relay into the circuit so that its swinger, like 262, is actuated, the circuit now extending from ground 267, the "Read-in" front contact 270, and swinger 271 of relay RRI, through the left coil of the pertinent double relay $2^0$ to $2^9$, line 259, contact 260 of relay RCR to 24 v. indicated at 246. The lower terminals of the left coils of all double relays $2^0$ to $2^9$ are connected in parallel to line 272 leading to contact 270 of relay RRI, while contact 268 is connected to line 273 to which the lower terminals of all right coils of the double relays are connected in parallel.

When one of the double relays Figs. 3 to 5 is energized, its swinger like 262, Fig. 5 connects the upper terminal of the right hand coil of this relay to the 100 v. supply on line 236, through the resistor-condenser 264, 265 circuit, and at the same time connects the clutch coil like 237 in Fig. 14 to this same 100 v. supply on line 236. The right coil of the double relay will not be energized at this time because its other terminal is disconnected by the "hold" contact 268 of the "read-In" relay RRI. However, the clutch coils like 237 in Fig. 14 will be energized from the 100 volt circuit on line 236.

At any time after the read-in has been accomplished, the "Read-in" relay RRI may be de-energized by opening switch 269. This will disconnect the left coils of the double relays and energize their right coils by putting around at 267 on contact 268 connected to line 273. Therefore, which ever double relays are down will stay down because they are self holding through their own contacts like 263 in Fig. 5. This condition will be maintained until the positions of the stepping switches #1, #2 and #3, Figs. 3 to 5 have been changed and the "Read-in" relay RRI energized again, at which time the double relays $2^0$ to $2^8$ corresponding to the proper contacts on these stepping switches as well as double relay $2^9$ for relay DR1 will be energized and any previously energized relays that are not still corresponding to operating contacts on the stepping switches (and relay DR1) will be de-energized.

This "Read-in" circuit in Figs. 3 to 5 makes it possible to "read" the punched card or tape at a relatively slow rate and during times when the previous information is being held in the double relays $2^0$ to $2^9$ on the clutch coils like 237 in Fig. 14. At the same time, it makes it possible to change the information on these clutch coils very rapidly and at an accurately chosen time or under accurately chosen conditions.

As shown in Fig. 14, provision is made for reversing the input or output of the binary gear ratio in order to provide both negative and positive values of rate of change of curvature.

Accordingly, the shaft S8 is provided with a reversing set of gears like gear 312 which operate the shafts like 251 when magnet 313 is energized. Magnet 313 operates a lever 314 connected to shaft 312 by a universal 315. Spring 316 urges shaft S8 to the position shown in Fig. 14, magnet 313 when energized urging shaft S8 to its alternate position. One end of magnet 313 is connected to ground as shown and it is controlled by a switch 317 leading to 24 v. Switch 317 may be operated manually or by the program advance.

FEED RATE CONVERTER

Figure 2:
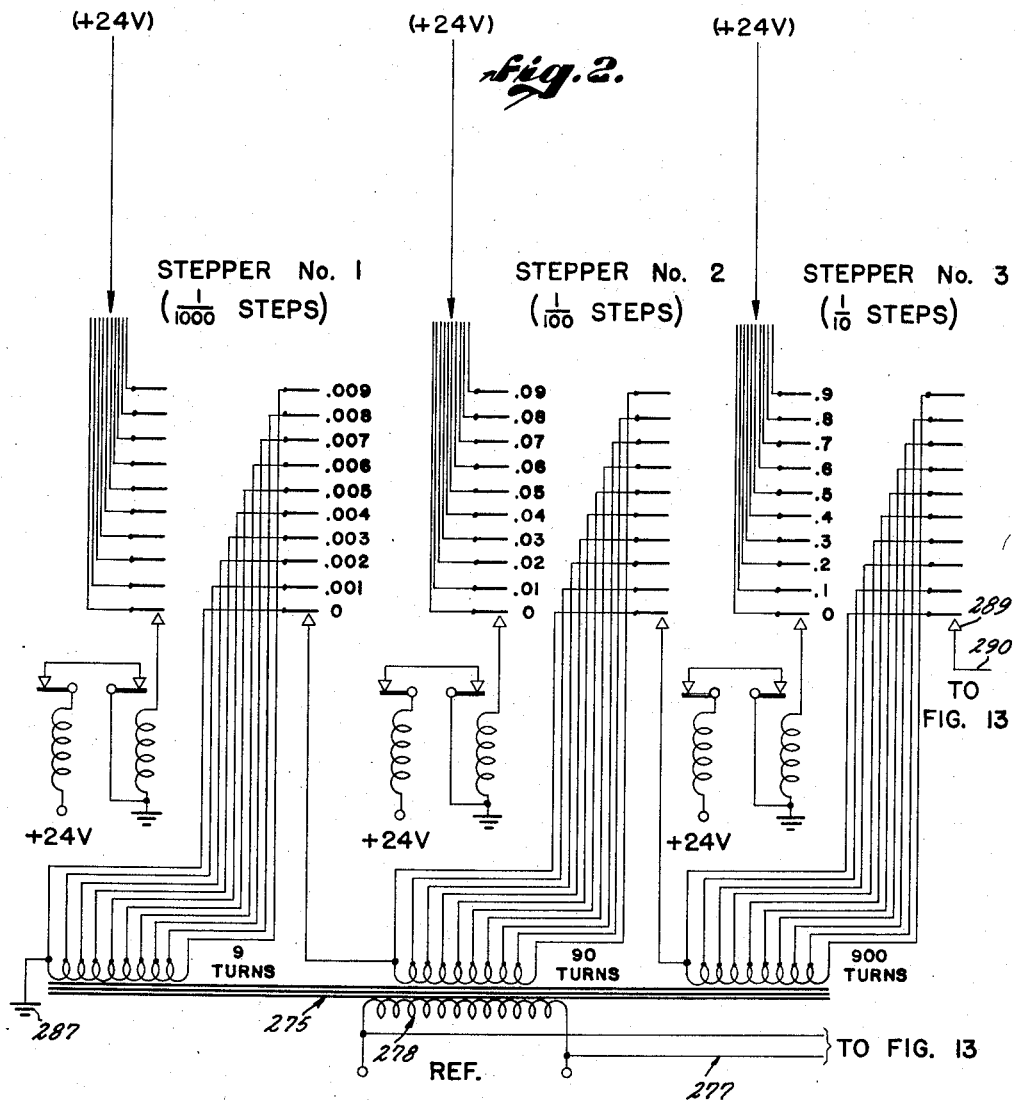

The input D1 in Fig. 1 supplies a decimal digital input to the analog feed rate converter in Fig. 2 wherein the steppers #1, #2, and #3 as well as their stepping magnets are the same as for curvature in Fig. 6. In Fig. 2, the transformer 275 is the same as transformer 206 in Fig. 6 except that the reverse winding 216 of the latter is omitted, the comparison of voltages being made between (1) the voltage of tachometer 276 driven by feed motor M3 in Fig. 13 and having a reference voltage fed by line 277 from the input to the primary winding 278 of transformer 275, and (b) the total voltage of the three steppers in Fig. 2 and picked off between ground 287 and wiper 289 connected to line 290. The servo indicated at 279, Fig. 13 drives the motor M3 at a rate such that the difference between the voltage generated by the stepping switch conversion circuit in Fig. 2 and the tachometer 276 in Fig. 13 is essentially zero. This circuit is shown for A. C. operation, but as mentioned before, resistors can be used instead of the transformer indicated, at 275 and then it will be possible and practical to use D. C. and a D. C. type of tachometer generator.

In connection with Fig. 16 it was described how the circuit 205 leading to the feed rate relay R2 is controlled by switch PB1 and relay R1, to stop the feed rate FR until the slope angle error signal is zero. In like manner, as shown in Fig. 15, circuit 205 includes the back contact 280 of swinger 281 of curvature null switch 282. This switch, when operated by the normally open push button, or program advance switch PB2 holds its swinger 281 open and its swinger 283 closed until the curvature error signal is zero. An amplifier is indicated at 284.

ZERO OFFSET

In the preceding description, and particularly in connection with Figs. 16 and 17, it has been shown how the shaft 8 is given an angular position or movement in accordance with the instructions contained in the input data of feed rate D1, rate of change of curvature D2, curvature D3 and slope D4. In connection with Fig. 17 and Fig. 18 it will be explained how the invention provides a zero offset or an adjustable zero reference for the origin or reference position with respect to the X and Y orthogonal axes along which machine drives are relatively driven to obtain a cutting path referenced to such axes, whereby the position of each axis for the machine drive may be referred to any selected origin of coordinates, either within the machine or outside of it.

Referring to Fig. 17, the shaft 8 input operates the feed resolver R3 to resolve the instruction contained in shaft 8 into linear displacements mutually at right angles to each other in accordance with the co-function values sin $\phi$ and cos $\phi$ as shown, which operate the ball slides 285 and 286 respectively of the disk-ball-cylinder X and Y integrators which integrate their inputs 285 and 286 with respect to the feed rate FR. Shaft S11 is an input to the differential gear DG2 in Fig. 18 and shaft S12 is an input to differential gear DG3. The other input to each of the differential gears DG2 and DG3 is here shown in each case as a manual input Z2 and Z3 respectively, for zero offset, namely to displace the origin of the tool path. Shaft S13 is an input to the electrical resolver R30 and shaft S14 is an input to the electrical resolver R40.

Resolver R30 has a single winding 302 rotatable relatively to its quadrature windings 300 and has a repeating cycle of once per revolution, while the fine data element 318, here shown as an Inductosyn, has a large number of poles per inch such as 20, with a repeating cycle of 0.1 inch. Inductosyn 318 has a scale S1 and a slider S2 having quadrature windings in circuit with the windings 300 of resolver R30. The linear X position of the servomotor M1 is controlled by the fine error signal in line 308 from the scale S1, by the medium error signal in line 306 and by the coarse error signal in line 307. The fine error signal in line 308 is always active, while the coarse and medium error signals are available on command by operating switch 401 to operate the relay 400. All three error signals operate at so called different "speeds" or under control of switch SW2, which is similar to switch 125 in Fig. 16; see page 84, vol. 25 of "Radiation Laboratory Series" referred to above, and vols. 17, 21 and 27 of the same series for reference to synchro and electrical resolver technique which may be used.

The resolver R31 is similar in construction to resolver R30 and it functions as a synchro transmitter, serving as a medium data element and having a single winding 329 and quadrature windings 319. Its quadrature windings 319 supply sine and cosine values, depending upon its angular position, to the quadrature windings 320 of a similar resolver R32 which serves as a synchro receiver. Resolver R32 has a winding 321 which supplies an error signal to the line 306 when relay 400 is active, and depending upon the desired X position established by operation of the handle or input Z2.

The coarse data element 322, here shown as a potentiometer, has a slider 323 connected to one end of a transformer primary winding 324, while the slider 325 of the coarse data receiver potentiometer 326 is connected to the other end of that winding, whereby the secondary winding 327 supplies to the line 307 an error signal depending upon the discrepancy if any, between the coarse position set up by the input Z2 and the coarse position assumed by the machine element such as carriage 178, Fig. 19, which is driven by the nut 179.

A reference source of voltage 304 energizes windings 329 and 302, as well as the potentiometers 322 and 326. Shaft S13 drives resolver R31 through a 10 to 1 gear ratio 330, this drive also operating potentiometer 322 as indicated by shaft 331. The motor shaft 184 drives resolver R32 through a 10 to 1 gear ratio 352, this drive also operating potentiometer 326 as indicated by shaft 332. Suitable gear ratios not shown may be employed in the shafts like 331 and 332, whereby the various mechanical linkages provide scale factors in the ratio of 100 in. to 10 in. to 0.1 in. for the coarse, medium and fine data elements like 322 and 326, R31 and R32, and 318 respectively.

The "Y" position control in Fig. 18 is similar to that above described for the "X" position, corresponding elements being shown.

After the "X" and "Y" positioning has been accomplished by operating the inputs Z2 and Z3 and by closing the switches 401 and 403, these switches are released so that the slope, curvature and rate of change of curvature information in shafts S11 and S12 take command.

GENERAL OPERATION

In general, when the feed rate FR is on, the slope motor 124 must be idle. Also, when the rate of change of curvature information is coming in, the curvature motor M4 must be stopped. At the origin, the feed is zero and the integrators are at rest. The feed resolver R3 is set only according to the slope angle, and the curvature potentiometer 213 and the magnetic clutches MC1 to MC10 are energized, the feed rate FR being zero. The curvature integrator 215 is positioned by (1) the curvature servo potentiometer 213 or (2) by the binary gear ratio shaft S9. The slope angle shaft 8 is positioned by (1) the slope angle servomotor 124, or (2) by the curvature integrator output S6. The desired control is brought about by operating the manual or program advance switches PB1, Fig. 16, PB2, Fig. 15, as well as the "card read" switch 247 and the "read-in" switch 269, Fig. 3, as described above.

The general operation from the start includes, (1) insertion of input data, (2) reading input data into the stepping switches, (3) establishing origin, (4) reading out from stepping switches into servos, (5) sequence of positioning the slope angle shaft and the curvature rack and engagement of binary clutches in preparing the machine to start motion, and (6) the feed rate control when new values of slope or curvature are desired. A brief description of these items follows:

(1) *Insertion of input data.*—The input data may be represented by holes in a card or tape with a card reader or push button control may be used. See pages 123 to 126 part 2 of "A Numerically Controlled Milling Machine" published May 31, 1953 by Servomechanisms Laboratory, M. I. T., Cambridge, Mass., for details of the card reader.

(2) *Reading input data into the stepping switches.*—This is accomplished on connecting the 24 v. supply for the input and on operating the card relay RCR.

(3) *Establishing the origin.*—This is done by (a) the machine itself in motion, (b) hand cranks on the machine, or (c) zero off-set Z2, Z3, by operating the normally open switches 400 and 402 by operating their push buttons or program advance switches 401 and 403, Fig. 18.

(4) *Reading out from stepping switches into servos.*—For this purpose, the operator energizes the slope angle push button or switch PB1, the curvature push button or switch PB2, and the read in relay RRI.

(5) *Sequence.*—This assumes that items (1) to (4) have received attention and that we are now determining the correct slope, or direction, curvature, and rate of change of curvature of the tool path. The correct sequence is: First, set up the proper slope angle on the slope angle shaft 8. Second, position the rack of the curvature integrator to its correct position, as determined by the radius of curvature. Third, operate the proper clutches of the binary gear ratio, Fig. 14, to establish the correct rate of change of curvature. The machine is not ready to start in motion until the origin is set up at X and Y and the last mentioned three conditions are met. At that time, the feed rate input signal is connected to the feed rate servo, to operate the feed rate drive FR.

(6) *New values.*—When a new slope angle is desired, push button PB1 is closed to allow the error signal (the difference between the new command from the card input and the present position of the slope angle Inductosyn 68), to operate relay R1 through amplifier A10, which controls the circuit 205 of relay R2, of the feed rate motor M3. Relay R1 is held operated as long as the error signal is present, independently of push button PB1, as explained earlier under the heading (b), "Program advance and supervisory control of feed rate."

In the same manner, the curvature servomotor M4 is energized by operating push button PB2, to operate the curvature null switch and its associated holding circuit, which likewise results in holding this switch by the curvature error, independently of the push button PB2.

The invention thus provides for obtaining a tool path in accordance with the instructions contained in the input data D1, D2, D3 and D4, as well as zero offset Z2 and Z3 and tool radius correction, if desired.

Various modifications may be made in the invention without departing from the scope and spirit of this invention.

I claim:

1. An automatic machine control system for driving a driven element along a path with respect to X and Y orthogonal axes, said system comprising means providing input data in terms of said path, means for translating said input data into corresponding movement of a shaft, means for resolving said shaft movement into linear displacements mutually at right angles to each other, and means for translating said displacements into coordinate speeds of said driven element along said axes respectively, said speeds having relative values corresponding to said path.

2. An automatic machine control system for driving a driven element at a certain slope with respect to X and Y orthogonal axes, said system comprising means providing angular input data in terms of said slope, means for translating said angular input data into corresponding movement of a shaft, means resolving said shaft movement into linear displacements mutually at right angles to each other, and means for translating said displacements into coordinate speeds of said driven element along said axes respectively, said speeds having relative values corresponding to said slope.

3. An automatic machine control system for driving a driven element along a path having a rate of change of curvature with respect to X and Y orthogonal axes, said system comprising means providing input data in terms of said rate of change of curvature, means for translating said input data into rotary movement of a shaft, means for resolving said rotary shaft movement into linear displacements mutually at right angles to each other, and means for translating said displacements into coordinate speeds of said driven element along said axes respectively, said speeds having relative values corresponding to the rate of change of curvature of said path.

4. An automatic machine control system for driving a driven element along a path having a rate of change of curvature with respect to X and Y orthogonal axes, said system comprising means providing input data in terms of said rate of change of curvature, means for translating said input data into rotary movement of a shaft, means for resolving said rotary shaft movement into linear displacements mutually at right angles to each other, means for driving said element along said axes at feed rates, and means for modifying said feed rates in accordance with said displacements, respectively.

5. An automatic machine control system for propelling an object along a path relatively to X and Y orthogonal axes wherein said object is carried by carriages relatively movable along said axes, said system comprising means providing digital input data corresponding to a desired path of movement of said object, means for converting said data into voltages having sine-cosine relationship, means for translating said voltages into angular displacement of a shaft, means for resolving said shaft displacement into orthogonal linear displacements, means for driving said carriages at feed rates along said axes respectively, and means for controlling each of said feed rates in accordance with one of said linear displacements.

6. An automatic machine control system according to claim 5 wherein said input data is in terms of the slope of said path.

7. A variable speed drive comprising a series of differentials having input and output shafts connected in series, each differential having another input, a drive shaft, a magnetic clutch for each of said differentials, each of said clutches having two positions for either connecting said other input of the differential to said drive shaft or for holding said other input, each of said differentials having gears providing a speed of its output shaft equal to one-half the sum of the speeds of its inputs, the input shaft at one end of said series being held, and the output shaft at the other end of said series comprising a variable speed drive shaft, and means comprising a binary digital input and switch circuits controlled thereby for energizing said clutches separately and in different combinations providing different speeds corresponding to the binary bits of said digital binary input.

8. A variable speed drive according to claim 7 in combination with means providing octal digital input data in terms of groups of digits wherein each group is a multiple (from 0 to 7), of powers (from 0 to a finite number) of 8, and means for converting said octal digital data into terms of successive powers of 2, said data thus converted comprising said binary digital input.

9. An electrical system for supplying electrical values corresponding to binary bits, said system comprising means providing octal digital input data in terms of groups of digits wherein each group is a multiple (from 0 to 7), of powers (from 0 to a finite number), of 8, a plurality of groups of relays each controlling a binary bit circuit, and a stepping switch for each of said octal groups, each of said stepping switches having steps controlling one of said groups of relays.

10. A steering system comprising separate means providing digital input data of the slope, curvature and rate of change of curvature of a path, separate means for translating each of said data into an analog value, means for controlling said curvature value in accordance with said rate of change of curvature value, means for modifying said slope value in accordance with said curvature value thus controlled, a driven element, and means for translating said slope value thus modified into movement of said driven element along said path.

11. A steering system comprising separate means providing digital input data of the curvature and rate of change of curvature of a path with respect to coordinate axes, a driven element for each of said axes, a feed rate drive for each of said elements, separate means for translating each of said data into an analog value, means for adding said values, an integrator driven by said feed rate drive, said integrator comprising means for integrating said added values with its said feed rate to provide an integration, and means for modifying the feed rate of each of said driven elements with said integration.

12. A steering system according to claim 11, comprising, a servo for positioning said curvature data translating means, and means for stopping said feed rate drives for both said integrator and said driven elements until said servo nulls.

13. A steering system according to claim 11 comprising, a servo having an error signal control depending on the discrepancy between the curvature input data and the position of said curvature translating means, a motor for the feed rate drives of said integrator and said driven elements, said motor having a circuit, and a relay responsive to said error signal and having a contact controlling said circuit.

14. A steering system according to claim 11 comprising, means providing a digital input of data of said feed rate in terms of speed, and means for controlling said feed rate drive in accordance with its said input data of feed rate.

15. A steering system comprising means providing digital feed rate input data in terms of speed, a binary gear device controlled thereby and comprising a series of magnetic clutch operated differentials providing various gear ratios, according to binary bits, between an input shaft and an output shaft, means providing digital input data of curvature, a curvature device having a movable member controlled by said curvature data, an integrator having an input drive shaft and having an output shaft driven at a speed dependent on the position of said curvature movable member, means providing said integrator with an input depending on the combined operation of said binary gear output shaft and said curvature member, means for stopping said input shaft of said binary gear device, and means for energizing said magnetic clutches in accordance with said rate of change of curvature input data while said stopping means is active.

16. A steering system according to claim 15 comprising, means responsive when said curvature member has reached a new position as called for by its input data to render active both the said input shaft for said binary gear device and said input drive shaft for said integrator.

17. A steering system comprising a drive shaft, driven elements movable along coordinate axes, a ball-disk-cylinder type integrator for each of said axes, a driving connection between each of said cylinders and one of said elements, a driving connection between each of said disks and said drive shaft, a mechanical resolver having a shaft and arms driven thereby in sine and cosine relationship, and a driving connection between each of said balls and one of said arms.

18. A steering system according to claim 17, and means for establishing different angular positions of said resolver shaft to establish the slope of relative movement of said driven elements.

19. A steering system according to claim 17, and means for angularly moving said shaft to relatively move said driven elements in a curved path.

20. A code converter comprising a stepping switch having a bank of stepping contacts and a plurality of other banks of contacts in circuits of different binary values respectively, said stepping bank having a digital input of values in a system of numeration having a radix greater than 2, said other banks each having its contacts selectively connected in parallel wherein each level thereof has active contacts for a binary sum value of said circuits equal to the higher order value of the stepping contact at that level.

21. A code converter according to claim 20, said greater radix being 8.

22. A code converter according to claim 20, and switching means controlling transfer of a particular value set up in said digital input to said stepping switches.

23. A code converter according to claim 20, a self locking double relay for each of said binary circuits, a current supply for said relays and for said binary circuits, and switching means for transferring the binary sum value to and for holding the same in said relays independently of said stepping switches.

24. A binary system comprising, a current supply, binary circuits each having a relay having a contact for connecting its binary circuit to said current supply, an input of digital data, stepping switches responsive to said input and having contacts of different binary values controlling said relays, means for reading a particular value set up in said input into said stepping switches, and means for reading the binary value set up in said switches into said relays.

25. A binary system according to claim 24, in combination with a series of differential gears having a binary gear ratio, said differential gears having magnetic clutches controlled by said binary circuits.

26. A machine tool control comprising a differential gear having two inputs and an output, a driven element position control for one of said inputs, an electrical resolver controlled by said output, a driven element having a servo circuit and a fine data element having quadrature windings responsive to said resolver for controlling said servo circuit, said other input of said differential gear comprising means for adjusting the range through which said driven element is controlled by said one input.

27. A machine tool control system comprising, means providing input data pertinent to a characteristic of a tool position, a shaft, means for resolving rotation of said shaft into electrical values in space quadrature relation, drives responsive to said values respectively and arranged along coordinate axes for said tool position, and means for shifting the said electrical values for each of said drives.

28. An automatic machine control system for driving a driven element along a path having a rate of change of curvature with respect to X and Y orthogonal axes, said system comprising means providing input data in terms of said rate of change of curvature, means for translating said input data into rotary movement of a shaft, means for reversing the direction of rotation of said shaft to provide both negative and positive values of said rate of change of curvature, means for resolving said rotary shaft movement into linear displacements mutually at right angles to each other, and means for translating said displacements into coordinate speeds of said driven element along said axes respectively, said speeds having relative values corresponding to the rate of change of curvature of said path.

29. An automatic machine control system for driving a driven element along a path with respect to X and Y orthogonal axes, said system comprising means providing input data in terms of said path, means for translating said input data into rotary movement of a shaft, a servo motor having a shaft for said driven element, coarse, medium and fine data elements responsive to said first mentioned shaft for controlling said motor, and a zero offset for displacing said coarse, medium and fine data elements.

30. An automatic machine control system according to claim 29, means for rendering said coarse and medium data elements inactive at certain times, and means for rendering said coarse and medium data elements active in controlling said motor when said zero offset is active.

31. A program controlled drive for positioning a driven element along a path, including means providing input data in terms of said path, means for translating said input data into electrical signals for corresponding rotary movement of a shaft, means for resolving said shaft movement into linear displacements mutually at right angles to each other, and means for translating said displacements into other electrical signals for speeds of drives for said driven element, the speeds of said drives having relative values corresponding to the path.

References Cited in the file of this patent

UNITED STATES PATENTS

| | | |
|---|---|---|
| 2,627,055 | Calosi | Jan. 27, 1953 |
| 2,690,532 | Johnson | Sept. 28, 1954 |
| 2,717,979 | Gardiner | Sept. 13, 1955 |
| 2,745,972 | Sandock | May 15, 1956 |
| 2,753,500 | Calosi | July 3, 1956 |

UNITED STATES PATENT OFFICE
CERTIFICATE OF CORRECTION

February 24, 1959

Patent No. 2,875,390

Robert W. Tripp

It is hereby certified that error appears in the printed specification of the above numbered patent requiring correction and that the said Letters Patent should read as corrected below.

Column 2, line 5, for the serial number "608,204" read -- 608,024 --.

Signed and sealed this 28th day of July 1959.

(SEAL)
Attest:

KARL H. AXLINE

Attesting Officer

ROBERT C. WATSON
Commissioner of Patents